United States Patent
Antunes et al.

(10) Patent No.: US 9,704,111 B1
(45) Date of Patent: Jul. 11, 2017

(54) ELECTRONIC TRANSCRIPTION JOB MARKET

(75) Inventors: Christopher S. Antunes, Arlington, MA (US); Jeremy E. Barron, Medford, MA (US); Roger S. Zimmerman, Wellesley, MA (US); Christopher E. Johnson, Cambridge, MA (US); Joshua Miller, Cambridge, MA (US); Anatole Khesin, Somerville, MA (US)

(73) Assignee: 3Play Media, Inc., Boston, MA (US)

( * ) Notice: Subject to any disclaimer, the term of this patent is extended or adjusted under 35 U.S.C. 154(b) by 103 days.

(21) Appl. No.: 13/246,123

(22) Filed: Sep. 27, 2011

(51) Int. Cl.
G10L 15/00 (2013.01)
G06Q 10/06 (2012.01)

(52) U.S. Cl.
CPC .................................. G06Q 10/06 (2013.01)

(58) Field of Classification Search
CPC ...................................................... G06F 15/16
USPC ........................................ 704/235, 260, 201
See application file for complete search history.

(56) References Cited

U.S. PATENT DOCUMENTS

| | | | |
|---|---|---|---|
| 5,179,627 A | 1/1993 | Sweet et al. | |
| 5,721,940 A | 2/1998 | Luther et al. | |
| 6,172,675 B1 | 1/2001 | Ahmad et al. | |
| 6,243,419 B1 | 6/2001 | Satou et al. | |
| 6,363,380 B1 | 3/2002 | Dimitrova | |
| 6,473,778 B1 | 10/2002 | Gibbon | |
| 6,505,153 B1 | 1/2003 | Van Thong et al. | |
| 6,580,437 B1 | 6/2003 | Liou et al. | |
| 6,710,811 B1 | 3/2004 | Lin et al. | |
| 6,980,953 B1 | 12/2005 | Kanevsky et al. | |
| 7,016,844 B2 | 3/2006 | Othmer et al. | |
| 7,031,998 B2 * | 4/2006 | Archbold | G06F 9/4881 709/201 |
| 7,558,735 B1 * | 7/2009 | Obilisetty | 704/270.1 |
| 8,918,311 B1 | 12/2014 | Johnson et al. | |
| 2002/0075403 A1 | 6/2002 | Barone, Jr. et al. | |
| 2002/0077833 A1 | 6/2002 | Arons et al. | |
| 2002/0128842 A1 * | 9/2002 | Hoi et al. | 704/260 |
| 2003/0190148 A1 | 10/2003 | Lee | |
| 2004/0170392 A1 | 9/2004 | Lu et al. | |
| 2004/0255249 A1 | 12/2004 | Chang et al. | |
| 2006/0026052 A1 * | 2/2006 | Klett | G06Q 10/06 705/7.12 |
| 2007/0033515 A1 | 2/2007 | Sull et al. | |
| 2007/0118801 A1 | 5/2007 | Harshbarger et al. | |
| 2007/0253680 A1 | 11/2007 | Mizote et al. | |
| 2008/0059173 A1 * | 3/2008 | Gilbert et al. | 704/235 |
| 2008/0276159 A1 | 11/2008 | Narayanaswami et al. | |
| 2009/0222346 A1 * | 9/2009 | Greene | G06Q 10/04 705/14.53 |
| 2010/0125450 A1 * | 5/2010 | Michaelangelo et al. | 704/9 |
| 2010/0223128 A1 | 9/2010 | Dukellis et al. | |

(Continued)

*Primary Examiner* — Rokib Masud
(74) *Attorney, Agent, or Firm* — Finch & Maloney PLLC

(57) ABSTRACT

A system for transcription is controlled and optimized by computer software which implements a competitive market for jobs is presented. Jobs are characterized by type, deadline, domain, difficulty, pay rate, customer and other factors. Editors are given credentials to perform jobs based on a complex of editor and job characteristics, and all editors qualified for a given job may then perform actions to preview and to claim the job. Job characteristics are adjusted dynamically to ensure that they are completed accurately and according to schedule.

33 Claims, 8 Drawing Sheets

(56) References Cited

U.S. PATENT DOCUMENTS

| | | |
|---|---|---|
| 2011/0022394 A1 | 1/2011 | Wide |
| 2012/0155658 A1 | 6/2012 | Tsunoo et al. |
| 2012/0304062 A1 | 11/2012 | Schultz et al. |
| 2012/0315009 A1 | 12/2012 | Evans et al. |
| 2013/0011121 A1 | 1/2013 | Forsyth et al. |
| 2013/0060572 A1 | 3/2013 | Garland et al. |
| 2013/0100347 A1 | 4/2013 | Zinovieva |
| 2013/0124984 A1 | 5/2013 | Kuspa |
| 2014/0105505 A1 | 4/2014 | Ioffe et al. |

* cited by examiner

ELECTRONIC TRANSCRIPTION JOB MARKET

BACKGROUND

Technical Field

The technical field relates generally to transcription of content and, more particularly, to systems and methods that provide an electronic transcription market.

Background Discussion

Transcription of internet-hosted media (video and audio) is increasingly in demand. Consumers of such media often prefer having captions available to them, and in some cases (e.g. for the hearing impaired), they require it. New federal and state regulations mandating accessibility to online media are also driving this demand. Additionally, transcription of online content makes possible applications that are difficult if not impossible without transcriptions. For example, television and radio post-production usually require transcriptions of all recorded material so that the producer can easily select segments for the final product. Market research firms use transcriptions of focus group video to search for sections of the videos in which consumers are discussing a certain product. Similar search applications are enticing for institutions with large video archives, such as universities and governments.

However, transcription is expensive. Typically, services for high-quality caption creation can cost several hundreds of dollars per hour of content. For some types of content, special expertise is needed to create accurate transcriptions. For example, a university mathematics lecture may include many specialized terms, which require at least some familiarity with the material. This limits the workforce that can execute certain transcriptions, increasing the expense. Some customers require transcriptions to be done on very short deadlines, and, in combination with the difficulty of the transcription task, this requirement can further increase the cost. Further complicating matters is the fact that transcriptions that have very long durations can be onerous for a single editor to complete, especially in light of tight deadlines.

Recently, computer software systems have come into place to address this demand and these challenges. Some of these systems accept media files and use automatic speech recognition to create draft transcripts for media files. The draft transcripts, in general, have many errors. The errors can occur in the actual words that are recognized, in the timing of the words, in the formatting of the words, and in other areas that may be required of the final transcript. For example, multi-speaker media files usually require that speaker turns be labeled, and automatic speech recognition is not good at this task. Additionally, the quality of the transcriptions derived from automatic speech recognition output is extremely variable, due to a large number of factors, including acoustical environment, recording equipment, number of speakers, speaker characteristics, speaking style, complexity of content, and digital encoding algorithms. These same factors also impact the difficulty of the human transcription task.

SUMMARY

At least some aspects and embodiments disclosed herein provide for a computer system that addresses these challenges. For instance, one such system is provided by 3Play Media of Cambridge, Mass. The 3Play Media system accepts media files uploaded over the internet by customers that wish to have time-coded transcriptions and, ultimately, captions, produced for each file. In addition, the 3Play Media system provides a transcription editing platform that optimizes correction of automatic speech recognition output to create a high-quality transcript. Editors using this platform can be granted permission to access the automatic speech recognition drafts and the associated media files from 3Play Media's server, and, while such permission is in effect, edit the speech recognition output, including correcting words, formatting, time-codes and speaker identification, and then store the corrected transcription to 3Play Media's server. This platform is optimized to reduce the time it takes to edit a draft transcription.

According to at least one embodiment, a system for managing an electronic transcription market is provided. The system includes a memory; at least one processor coupled to the memory; a customer interface component executed by the at least one processor and configured to receive media file information including at least one media file, the at least one media file including content; an automatic speech recognition (ASR) component executed by the at least one processor and configured to generate transcription information that represents a transcription of the content; and a market engine component executed by the at least one processor; and an editor interface component executed by the at least one processor and configured to receive job claim information including an identifier of the job record. The market engine component is configured to determine pay rate information that represents a pay rate for editing the transcription; create a job record that represents a job; store the pay rate information in the job record; and store association information that associates the job record with the at least one media file.

In the system, the editor interface component may be further configured to provide at least one preview of the job and the market engine component is configured to determine the pay rate information using a number of previews provided by the editor interface component. The customer interface may be further configured to create at least one media file record that represents the at least on media file, the at least one media file record including information indicating a due date for transcription of the content and the market engine component is configured to determine the pay rate information using the due date. The market engine component may be further configured to periodically determine an attribute of the job record. The attribute may include the pay rate information. The market engine component may be configured to periodically determine the attribute upon expiration of a waiting period. The editor interface component may be further configured to provide at least one preview of the job and the market engine component is configured to modify the waiting period based on a number of previews provided by the editor interface component.

In the system, an attribute of the job record may indicate that a claim has been accepted for the job, and the market engine component may be further configured to determine a predicted completion date for the job; determine whether the predicted completion date is after the due date; and revoke the claim accepted for the job where the predicted completion date is after the due date.

The system may further include an administrator interface executed by the at least one processor and configured to modify at least one attribute of the at least one media file that is used to determine the pay rate. Also, in the system, an attribute of the job record may indicate that progress has been made on the job and the market engine component may be further configured to determine a predicted completion date for the job; determine whether the predicted completion date is after the due date; and split the at least one media file into a plurality of media files where the predicted completion date is after the due date. Furthermore, the market engine component may be further configured to modify an attribute of the job record that indicates whether an editor may claim the job.

According to another embodiment, a method for managing an electronic transcription market using a computer system is provided. The method includes acts of receiving, by the computer system, media file information including at least one media file, the at least one media file including content; generating transcription information that represents a transcription of the content; determining pay rate information that represents a pay rate for editing the transcription; creating a job record that represents a job; storing the pay rate information in the job record; storing association information that associates the job record with the at least one media file; and receiving job claim information including an identifier of the job record.

The method may further include an act of providing at least one preview of the job, wherein determining the pay rate information includes determining the pay rate information using a number of previews provided. The method may further include an act of creating at least one media file record that represents the at least on media file, the at least one media file record including information indicating a due date for transcription of the content, wherein determining the pay rate information includes determine the pay rate information using the due date. The method may further include an act of periodically determining an attribute of the job. The method may further include acts of providing at least one preview of the job; and modifying the waiting period based on a number of previews provided. The method may further include an act of modifying an attribute of the job record that indicates whether an editor may claim the job.

In the method, the act of determining the pay rate information may include an act of determining the pay rate information using an attribute of the at least one media file record other than the due date. The act of periodically determining the attribute of the job may include periodically determining the attribute upon expiration of a waiting period. The act of periodically determining the attribute of the job may include an act of periodically determining the pay rate information.

An attribute of the job record may indicate that a claim has been accepted for the job, and the method may further include determining a predicted completion date for the job; determining whether the predicted completion date is after the due date; and revoking the claim accepted for the job where the predicted completion date is after the due date. An attribute of the job record may indicate that progress has been made on the job, and the method further comprises determining a predicted completion date for the job; determining whether the predicted completion date is after the due date; and splitting the at least one media file into a plurality of media files where the predicted completion date is after the due date.

According to another embodiment, a computer readable medium is provided. The computer readable medium stores instructions that when executed by at least one processor of a computer system cause the computer system to receive media file information including at least one media file, the at least one media file including content; generate transcription information that represents a transcription of the content; determine pay rate information that represents a pay rate for editing the transcription; create a job record that represents a job; store the pay rate information in the job record; store association information that associates the job record with the at least one media file; and receive job claim information including an identifier of the job record.

Other aspects and embodiments manifest an appreciation that, even with an optimal process for editing individual draft transcriptions, there still remains the challenge of globally optimizing the process while preserving consistency for a large set of files being processed by a large number of editors. The complexity of the problem results from the variability of automatic speech recognition output, the variable skill sets of the human editors, and the variability of the audio quality, among other factors. Further, some embodiment and aspects manifest an appreciation that optimizing the scheduling of the editing jobs is complicated by customer deadline requirements in the presence of variable editor work schedules as well as variable data volume flow into the system.

Still other aspects, embodiments and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment. References to "an embodiment," "an example," "some embodiments," "some examples," "an alternate embodiment," "various embodiments," "one embodiment," "at least one embodiment," "this and other embodiments" or the like are not necessarily mutually exclusive and are intended to indicate that a particular feature, structure, or characteristic described in connection with the embodiment may be included in at least one embodiment. The appearances of such terms herein are not necessarily all referring to the same embodiment.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

At least one embodiment disclosed herein includes apparatus and processes for implementing, using a computer system, a transcription job market. In some embodiments, the transcription job market receives information from customers that identifies media files with encoded audio content that the customers seek to have transcribed. In these embodiments, the transcription job market creates and posts jobs associated with the media files.

In other embodiments, the transcription job market manages market elements to ensure that jobs are being completed according to schedule and with quality. These market elements may include one or more attributes of one or more jobs. In some embodiments, the transcription job market receives information from editors that identifies jobs that the editors seek to complete. In these embodiments, the transcription job market further provides tools used by the editors to complete their transcription tasks. These tasks may produce transcriptions that are time-coded and transcriptions that lack time-coding, i.e., are "non-time-coded."

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Transcription System

Figure 1:
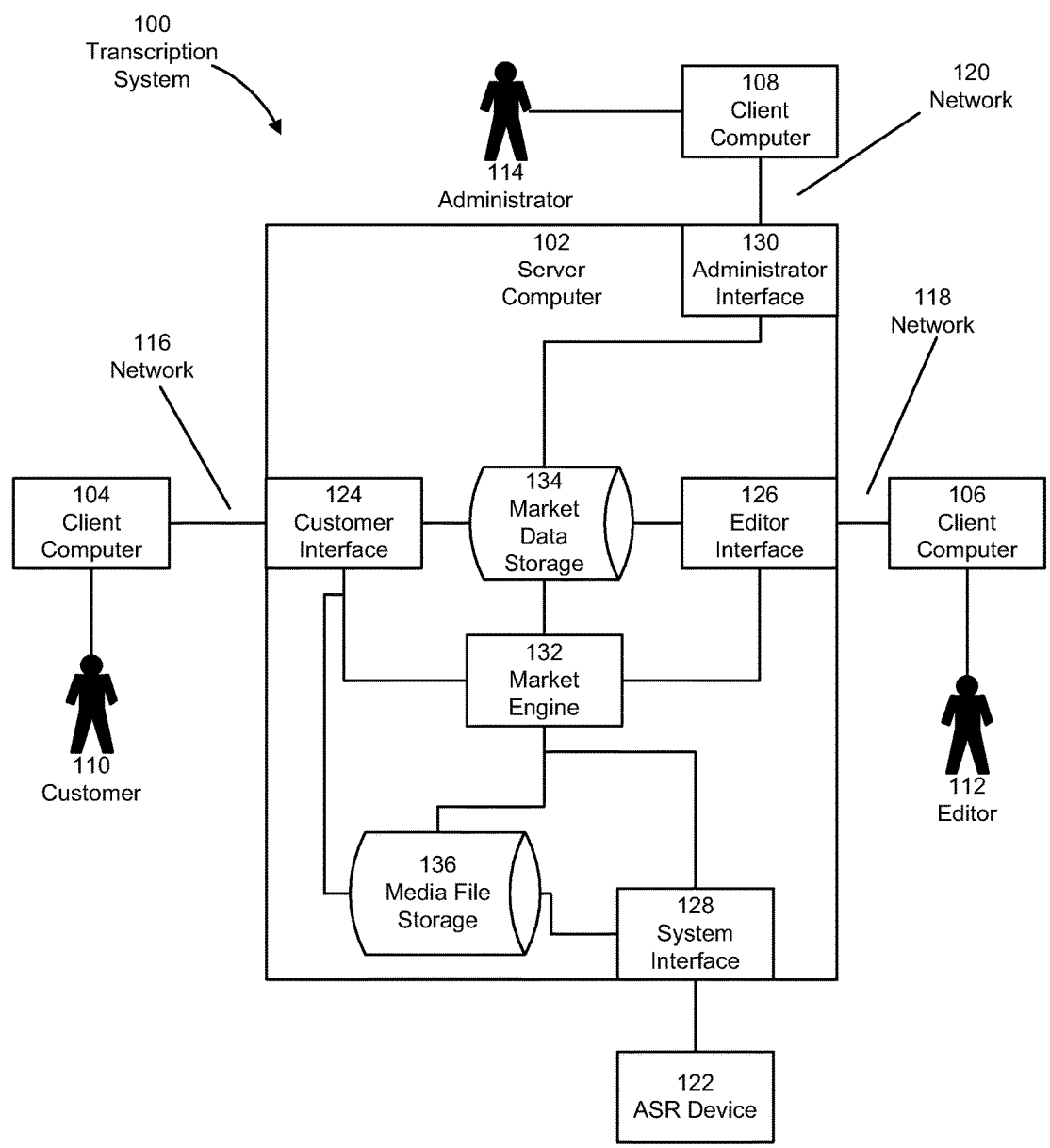
FIG. 1 is a context diagram including an exemplary transcription system.

Various embodiments implement a transcription system using one or more computer systems. FIG. 1 illustrates one of these embodiments, a transcription system 100. As shown, FIG. 1 includes a server computer 102, client computers 104, 106, and 108, a customer 110, an editor 112, an administrator 114, networks 116, 118 and 120, and an automatic speech recognition (ASR) device 122. The server computer 102 includes several components: a customer interface 124, an editor interface 126, a system interface 128, an administrator interface 130, a market engine 132, a market data storage 134 and a media file storage 136.

As shown in FIG. 1, the system interface 128 exchanges (i.e. sends or receives) media file information with the ASR device 122. The customer interface 124 exchanges information with the client computer 104 via the network 116. The editor interface 126 exchanges information with the client computer 106 via the network 118. The networks 116, 118 and 120 may include any communication network through which computer systems may exchange information. For example, the network 116, the network 118, and the network 120 may be a public network, such as the internet, and may include other public or private networks such as LANs, WANs, extranets and intranets.

Information within the transcription system 100, including data within the market data storage 134 and the media file storage 136, may be stored in any logical construction capable of holding information on a computer readable medium including, among other structures, file systems, flat files, indexed files, hierarchical databases, relational databases or object oriented databases. The data may be modeled using unique and foreign key relationships and indexes. The unique and foreign key relationships and indexes may be established between the various fields and tables to ensure both data integrity and data interchange performance. In one embodiment, the media file storage 136 includes a file system configured to store media files and other transcription system data and acts as a file server for other components of the transcription system. In another embodiment, the media file storage 136 includes identifiers for files stored on another computer system configured to serve files to the components of the transcription system.

Information may flow between the components illustrated in FIG. 1, or any of the elements, components and subsystems disclosed herein, using a variety of techniques. Such techniques include, for example, passing the information over a network using standard protocols, such as TCP/IP or HTTP, passing the information between modules in memory and passing the information by writing to a file, database, data store, or some other non-volatile data storage device. In addition, pointers or other references to information may be transmitted and received in place of, in combination with, or in addition to, copies of the information. Conversely, the information may be exchanged in place of, in combination with, or in addition to, pointers or other references to the information. Other techniques and protocols for communicating information may be used without departing from the scope of the examples and embodiments disclosed herein.

Figure 8:
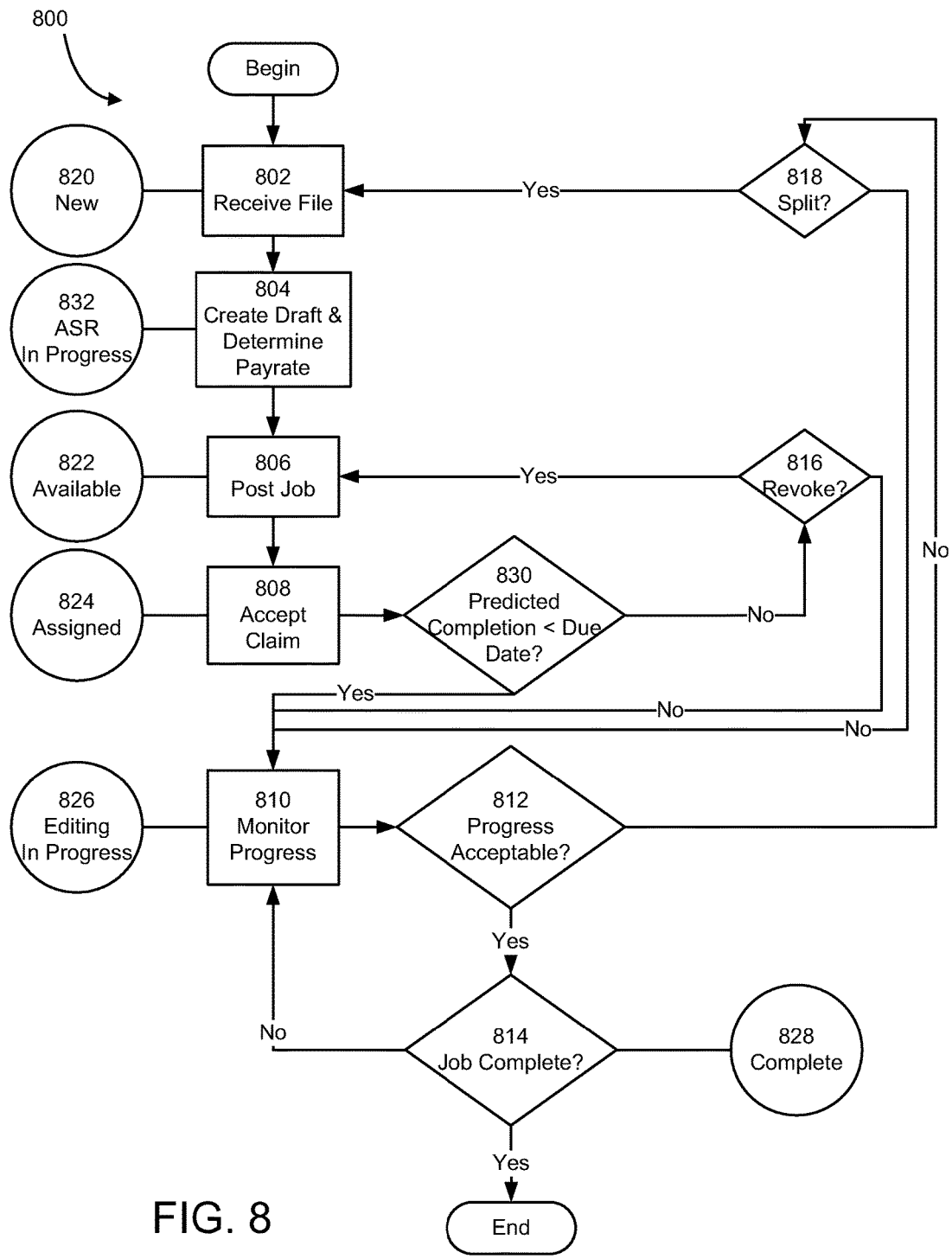
FIG. 8 is a flow diagram illustrating states assumed by a transcription job during execution of an exemplary transcription system.

One goal of the transcription system 100 is to receive media files from customers and to provide final transcriptions of the content included in the media files to the customers. One vehicle used by the transcription system 100 to achieve this goal is a transcription job. Within the transcription system 100, transcription jobs are associated with media files and are capable of assuming several states during processing. FIG. 8 illustrates an exemplary process 800 during the execution of which a transcription job assumes several different states.

As shown in FIG. 8, the process 800 begins when the transcription system 100 receives a media file to transcribe in act 802. In some embodiments, the transcription system 100 receives the media file via an upload from a customer interface, such as the customer interface 124, or as a result of a previously received media file being split, per act 818 below. Upon receipt of the media file, the transcription system 100 creates a job, associates the job with the media file, and sets the job to a new state 820. In act 804, the transcription system 100 determines the pay rate for the job and sets the job to an ASR in progress state 832. In act 806, the transcription system 100 posts the job, making the job available for editors to claim, and sets the job to an available state 822. As described further below, in some embodiments in accord with FIG. 8, the transcription system 100 monitors the due dates of available jobs and, if necessary, alters the pay rate (or other job characteristics) of the available jobs to ensure the available jobs are completed by the due date.

In act 808, the transcription system 100 accepts an offer by an editor to claim the job and sets the job to an assigned state 824. In the illustrated embodiment, jobs in the assigned state 824 are not available for claiming by other editors. In act 830, the transcription system 100 determines whether the predicted completion date for the job, as assigned, occurs before the due date. If so, the transcription system 100 executes act 810. Otherwise the transcription system 100 executes act 816.

In the act 816, the transcription system 100 determines whether to revoke the job. If so, the transcription system executes the act 806. Otherwise, the transcription system 100 executes the act 810.

In the act 810, the transcription system 100 records and monitors actual progress in transcribing the media file associated with the job, as the progress is being made by editors. Also in the act 810, the transcription system 100 sets the job to an editing in progress state 826. In the act 812, the transcription system 100 determines whether the job is progressing according to schedule. If so, the transcription system executes act 814. Otherwise, the transcription system executes act 818.

In the act 818, the transcription system 100 determines whether to split the media file associated with the job into multiple media files. For example, the transcription system may split the media file into one segment for any work already completed and into another segment for work yet to be completed. If the transcription system 100 splits the media file, the transcription system 100 executes the act 802 for any segments that include content not completely transcribed. If, in the act 818, the transcription system 100 determines to not split the media file, the transcription system executes the act 810.

In the act 814, the transcription system 100 determines whether the content of the media file associated with the job is completely transcribed. If so, the transcription system sets the state of the job to a complete state 828, and the process 800 ends. Otherwise, the transcription system 100 executes the act 810.

In some embodiments, completed transcriptions may be the subject of other jobs, such as QA, auditing or customer auditing, as described further below. Components included within various embodiments of the transcription system 100, and acts performed as part of the process 800 by these components, are described further below.

According to various embodiments illustrated by FIG. 1, the market engine 132 is configured to both add jobs to the transcription job market provided by the transcription system 100 and to maintain the efficiency of the transcription job market once the market is operational. To achieve these goals, in some embodiments, the market engine 132 exchanges market information with the administrator interface 130, the editor interface 126, the system interface 128, the market data storage 134 and the media file storage 136. Market information may include any information used to maintain the transcription job market or stored within the market data storage 134. Specific examples of market information include a media file information, job information, customer information, editor information and administrator information. This information is described further below with reference to FIG. 2.

In some embodiments, the market engine 132 is configured to identify unprocessed media files stored in the media file storage 136. In some of these embodiments, the market engine 132 identifies unprocessed media files after receiving an indication of the storage of one or more unprocessed media files from another component, such as the customer interface 124, which is described further below. In others of these embodiments, the market engine 132 identifies unprocessed media files by periodically executing a query, or some other identification process, that identifies new, unprocessed media files by referencing information stored in the market data storage 134 or the media file storage 136.

In some embodiments, the market engine 132 is also configured to send a request for ASR processing of unprocessed media files to the system interface 128. In these embodiments, the system interface 128 is configured to receive requests for ASR processing, and, in response to these requests, provide the unprocessed media files to the ASR device 122. The ASR device 122 is configured to receive a media file, to perform automatic speech recognition on the received media file and to respond with draft transcription information that includes a draft (time-coded or non-time-coded) transcription of the content of the received media file and a predicted cost of editing the draft transcription. This predicted cost, referred to herein as the ASR_cost is based on information computed as part of the ASR processing and a cost model The cost model may be a general model or may be associated with the project, customer or editor associated with the media file. A project is a set of media files grouped by a customer according to domain, due date or other media file attribute and are described further below. Cost models predict the cost of editing a draft transcription and are described further with reference to FIG. 2 below. The system interface 128 is further configured to receive the draft transcription information, store the draft transcription information in the media file storage 136, store the location of the draft transcription information in the market data storage 134, and notify the market engine 132 of the availability of the draft transcription information.

In one example illustrated by FIG. 1, the market engine 132 receives an identifier of a newly stored media file from the customer interface 124. Responsive to receipt of this identifier, the market engine 132 provides a request to perform ASR processing on the media file to the system interface 128. The system interface 128, in turn, retrieves the media file from the media file storage 136 and provides the media file, along with a set of parameters that indicate appropriate language, acoustic, cost and formatting models, to the ASR device 122. The ASR device 122 responds with draft transcription information that includes a time-coded draft transcription, lattices, search statistics, ASR_cost and other associated data. The system interface 128 receives the draft transcription information, stores the draft transcription information in the media file storage 136, stores the location of the draft transcription information in the market data storage 134 and notifies the market engine 132 of the availability of the draft transcription information.

In other embodiments, the market engine 132 is configured to perform a variety of processes in response to receiving a notification that draft transcription information is available. For instance, in one example, after receiving a notification that draft transcription information is available, the market engine 132 employs natural language processing techniques to determine the type of content or domain included in the media file associated with the draft transcription information and stores this information in the market data storage 134. In another example, the market engine 132 determines the duration of the content included in the media file and stores the duration in the market data storage 134. In another example, after receiving a notification that draft transcription information is available, the market engine 132 determines an initial pay rate for editing the draft transcription included in the draft transcription information and stores job information associated with the draft transcription in the market data storage 134. In this example, the initial pay rate included in the job information is determined using the due date, difficulty, duration, domain and ASR_cost of the media file associated with the draft transcription information. In other examples, other combinations of these factors may be used, or these factors may be weighted differently from one another. For instance, in one example, due date and duration may be replaced with times-real-time. In another example, the weight applied to any particular factor may be 0.

In other embodiments, the market engine 132 is configured to periodically publish, or "push," notifications to editors that indicate the availability of new jobs. In one of these embodiments, the market engine 132 tailors these notifications by sending them only to particular editors or groups of editors, such as those editors who have permission to edit the jobs. In other embodiments, the market engine 132 tailors notifications based on other job characteristics, such as the type of job (editing, QA, auditing, etc), difficult, domain or due date. In some examples, the market engine 132 sends notifications to editors based on their ability to complete jobs having the attribute to which that the notification is tailored. Continuing the previous examples, the market engine 132 may send notifications to editors who may assume particular roles (editor, QA, auditor, etc.), who have a track record of handling difficult jobs, who are well versed in a particular domain or who are highly efficient.

In at least one embodiment, the market engine 132 notifies editors of near-term future job availability based on the upstream workflow. In this embodiment, as files are being uploaded by customers and processed by the ASR device, the market engine 132 predicts how many more jobs will be available and based on one or more of the attributes of these jobs, such as duration, domain, etc., the market engine 132 sends out advanced notice to one or more editors via the editor interface 126.

In other embodiments, the market engine 132 is configured to determine the difficulty of successfully editing the draft transcription and store the difficulty in the market data storage 134. In these embodiments, the market engine 132 may base this determination on a variety of factors. For example, in one embodiment, the market engine 132 calculates the difficulty using an equation that includes weighted variables for one or more of the following factors: the content type (domain) of the media file, the historical difficulty of media files from the customer (or the project), the draft transcription information, and acoustic factors (such as noise-level, signal-to-noise-ratio, bandwidth, and distortion).

In some embodiments, the market engine 132 is configured to create and post jobs corresponding to unedited media files, thereby making the jobs available to the editors for claiming and completion. According to one example, as part of this processing, the market engine 132 stores an association between each job and a media file targeted for work by the job. This action is performed so that factors affecting pay rate, such as those described above, can be located in a media file table.

As described further below with reference to the editor interface 126, editors claim jobs by indicating their preferences on a user interface provided by the editor interface 126. After a job is claimed, the job is removed from the market, so that no other editors can access the job. However, until the editor has actually begun to edit the job, it is relatively easy for the job to be put back on the market. Typically, leaving the original claim in place is preferred. However, in some embodiments, the market engine 132 is configured to determine whether the editor who claimed the job will be able to complete the job before the due date. In these embodiments, the market engine 132 is configured to make this determination based on the job characteristics (difficulty, domain, duration, etc.) and the editor's historical proficiency as stored in the market data storage 134. For example, the editor may be associated with a times-real-time statistic stored in the market data storage 134. The times-real-time statistic measures editor productivity and is calculated by dividing the time it takes for the editor to complete each job by the duration of the media file associated with each job. In some embodiments, the market engine 132 is configured to use this statistic to estimate the completion time of the job (based on duration multiplied by times-real-time). In some embodiments, the market engine 132 is configured to condition this statistic based on job attributes, and thus compute the statistic from similar jobs performed by the editor in the past. The set of historical jobs used to compute the times-real-time statistic may include all jobs performed by the editor, a subset of jobs which have similar attributes to the present job, or other combinations of historical jobs, including those that were not performed by the editor. The market engine 132 may calculate this statistic as a mean, a median, a duration-weighted mean, or using summaries of historical processing times for the editor or other editors for different media file subsets.

In other embodiments, if the market engine 132 determines that an editor may be unlikely to complete a job before the due date, the market engine 132 may reverse the assignment and put the job back on the market, thus allowing some number of other editors to claim the job. In some these embodiments, the market engine 132 determines the likelihood that the editor will complete the job before its due date using one or more of the following factors: historical productivity of the editor (in general or, more specifically, when editing media files having a characteristic in common with the media file associated with the job); the number of jobs currently claimed by the editor; the number of jobs the editor has in progress; and the due dates of the jobs claimed by the editor. When the market engine 132 reverses an assignment, the original editor is informed of this condition via the editor interface 126. The market engine 132 may or may not allow the original editor to reclaim the job from the market, depending on whether data indicates interest of other editors in the job. One example of an indicator of interest is whether the job is being previewed by any other editors. Another factor which may influence this decision is if the total volume of unedited draft transcriptions exceeds a threshold.

In some embodiments, the market engine 132 determines a likelihood of completion for each possible combination of editor and job. In these embodiments, the market engine 132 may calculate this likelihood using any combination of the factors discussed above (historical productivity, number of jobs claimed, number of jobs in progress, due dates of claimed jobs, etc.). Further, in some embodiments, the market engine 132 prevents editors from claiming jobs for which the editor's likelihood of completion metric transgresses a threshold. In these embodiments, the threshold is a configurable parameter. Further, according to these embodiments, the market engine 132 may prevent an editor from claiming a job in a variety of ways including rejecting an offer from the editor to claim the job and causing the job to not be display to the editor within the editor interface 126 via, for example, a meta rule. Meta rules are discussed further below.

In other embodiments, if the market engine 132 determines that an editor may be unlikely to complete a job before the due date, the market engine 132 sends a notification to the editor who claimed the job via the editor interface 126. The notification may include a variety of information, such as a notification that the job may be revoked shortly or including a link to allow the editor to voluntarily release the job.

In several embodiments, the market engine 132 is configured to give permission to many editors to edit the same draft transcription and to offer all editors the same pay rate to do so. In some alternative embodiments, however, the market engine 132 is configured to determine if, based on historical information, some editors display an increased proficiency with particular types of media files (for example in certain domains) and to increase the pay rate for these editors when transcribing media files having the particular type. In addition, some embodiments of the market engine 132 are configured to adjust the pay rate based on overall editor experience levels, as well as the historical productivity of the editors, both in general and on the type of media file for which the rate is being set.

In general, the market engine 132 sets the pay rate based on the aforementioned factors, such as job difficulty, required times-real-time, and ASR_cost. However, to maintain an efficient market in some embodiments, the market engine 132 is configured to determine when market conditions suggest intervening actions and to, in some cases, automatically take those intervening actions. For example, when the market is saturated with non-difficult jobs, an abnormally large amount of unassigned, difficult jobs may develop. According to this example, to correct the inefficiency in the market, the market engine 132 intervenes by increasing the pay rate of difficult jobs or decreasing the pay rate of low difficulty jobs. In still another example, the market engine 132 intervenes to increase the pay rate of a job where the proximity of the current date and due date for the media file associated with the job transgresses a threshold.

In some embodiments, the market engine 132 is configured to use the preview functionality as an indicator of job difficulty and appropriate pay rate. For instance, in one example, the market engine 132 detects that the number of editors that have previewed a job and not claimed it has exceeded a threshold. Alternatively, in another example, the market engine 132 detects that the total preview duration of an unclaimed job has transgressed a threshold. These phenomena may indicate that the job is more difficult than is reflected by the current pay rate. The market engine 132 may then intervene to increase the pay rate to improve the chance that the job will be claimed or to split the file into segments.

Additionally, in some embodiments, the market engine 132 monitors the status of, and information associated with, all jobs available on the market. This information includes difficulty, pay rate, due date, domain and summary information such as the number of editors with permission to edit a draft transcription, the amount of time a job has been on the market, the number of previews of the media file associated with a job, and other data concerning the market status of the job and its associated media file. In some embodiments, the market engine 132 is configured to use this information to ensure that problem jobs are accepted. For example, the market engine 132 may increase the pay rate, may enable a larger number of editors to access to the file, or may cut the file into shorter segments—thus producing several less difficult editing jobs for the same media file.

In other embodiments, the market engine 132 is configured to, under certain conditions, hide some of the low difficulty jobs in order to create a more competitive environment or to induce editors to work on difficult jobs. Additionally, in some embodiments, the market engine 132 is configured to encourage the editors to accept less desirable jobs by bundling jobs together with more desirable jobs. For example, the market engine 132 may group a selection of jobs with variable difficulty together so that a single editor would need to claim all of these jobs, instead of claiming only low difficulty jobs. Other characteristics that may determine the desirability of a job, and which may be used to determine the bundling, include customer, project, domain (e.g. interesting content), and historical time waiting on the market for the customer/project.

In some embodiments, the market engine 132 is configured to analyze the overall status of the market prior to modifying job characteristics. For instance, in one example, the market engine 132 monitors the amount of work available in the market, and if the amount transgresses a threshold, increases the pay rate for jobs that are within a threshold value of their due dates. In other embodiments, the market engine 132 is configured to analyze the dynamics of the overall market to determine intervening actions to perform. In one example, the market engine 132 measures the rate at which jobs are being accepted and measures the number of jobs and/or duration of the jobs, and estimates the time at which only the least popular jobs will remain in the market. If the market engine determines that this time is sufficiently ahead of the due date for these jobs, then the market engine 132 may wait before increasing the pay rate.

In other embodiments, the market engine 132 is configured to set meta rules to affect the behavior of the market. Meta rules globally modify the behavior of the market by affecting how all or some of the available jobs will appear on the market. For instance, the market engine 132 may set a meta rule that prevents some percentage of the jobs from being available to any editors for a certain time period. The market engine 132 may use this rule during periods when there is a surplus of work, and therefore help to smooth out the flow of files through the system. Or, the market engine 132 may set a meta rule to make files available only to relatively inexperienced editors for a certain time period. The market engine 132 may use this rule where many relatively easy jobs are being processed by the market, so that the market presents a good opportunity to give less experienced editors more work in learning how to efficiently operate the editing platform. Or, the market engine 132 may set a meta rule that automatically send some percentage of jobs to multiple editors for cross-validation. Various embodiments may implement a variety of meta rules, and embodiments are not limited to a particular meta rule or set of meta rules.

In other embodiments, the market engine 132 is configured to implement a rewards program to encourage editors to claim difficult jobs. In one embodiment, the market engine 132 issues rewards points to editors for completing files and bonus points for completing difficult files. In this embodiment, the editor interface 126 is configured to serve a rewards screen via the user interface rendered on the client computer 106. The rewards screen is configured to receive requests to redeem reward and bonus points for goods and services or access to low difficulty media files.

In some embodiments, the market engine 132 is configured to estimate the expected completion time of the editing job and further refine the market clearing processes discussed above. If the market engine 132 determines that the current progress is not sufficient to complete the file on time, the editor may be notified of this fact via the editor interface 126, and, should the condition persist, the market engine 132 is configured to make the job available to other editors (i.e. to put the jobs back on the market). In some circumstances, the market engine 132 may revoke the entire job from the original editor. In this case, the job is put back on the market as if no work had been done. In other cases, the market engine 132 may dynamically split the job at the point where the original editor has completed editing, creating one or more new jobs that are comprised of the remaining file content. The market engine 132 puts these new job or jobs on the market, and the original editor is paid only for the completed work.

In other embodiments, the market engine 132 is configured to perform a variety of processes after receiving an indication that a job has been completed. For example, if a newly completed draft transcription information was split into segments, then the market engine 132 will concatenate completed segments together into a completed final transcript. In another example, the market engine 132 is configured to compare the final time-coded transcript with the draft transcription produced by the ASR device 122. In this example, the market engine 132 uses the number of corrections performed on the transcript to compute a standard distance metric, such as the Levenshtein distance. The market engine 132 stores this measurement in the market data storage 134 for later use in determining an objective difficulty for the editing job.

In various embodiments, the market engine 132 is configured to use the objective difficulty in a variety of processes. For example, in some embodiments, the market engine 132 uses the objective difficulty for a set of jobs to adjust the historical times-real-time statistic for an editor to determine the actual price that the customer pays for the transcription service, or as input to the automated difficulty-determination process discussed herein.

In other embodiments, the market engine 132 is configured to, prior to making the final transcript available to the customer, create and post a new job to validate the final transcription. For example, in one embodiment, the market engine 132 creates and posts a quality assurance job on the same market as the editing jobs. A subset of editors may be qualified for the quality assurance (QA) role, and the profiles of this subset may include a QA attribute. These editors would then be permitted to view, preview, and claim the QA jobs in the market via the editor interface 126. However, the editor of the original transcript would not have permission to QA their own job, even if the editor in general is qualified to perform in a QA role. The profiles of some editors may include a QA attribute, but lack an editor attribute. These editors would only be permitted to view, preview, and claim QA jobs.

As the QA jobs normally require much less work than the original editing job, in some embodiments, the market engine 132 is configured to set the pay rate for the QA jobs at a lower level. However, in other embodiments, the market engine 132 is configured to monitor and adjust the pay rate for the QA jobs as for the editing jobs, with similar factors determining the pay rate, including file difficulty, the ASR_ cost, the proximity of the file due date, and the media file duration. Additionally, in some embodiments, the market engine 132 is configured to use QA-specific factors to determine the pay rate for QA jobs. For example, in one embodiment, the market engine 132 adjusts the pay rate based on the number of flags in the edited transcript, the historical proficiency of the original editor, the times-real-time it took to produce the final transcription, and the ASR distance metric for the media file. Flags are set during the editing process and indicate problem content within the edited transcript. For example, flags may indicate content that is unclear or that requires additional research to ensure accurate spelling. In some embodiments, the flags are standardized to facilitate automatic processing by the components of the transcription system.

After this processing is complete, in some embodiments, the market engine 132 is configured to make the final time-coded transcription available to the customer, who may then download the transcription for his or her own use via the customer interface 124. The final transcript is also maintained in the media file storage 136 for reference and further processing, as discussed herein.

Similarly, in other embodiments, the market engine 132 is configured to create and post an auditing job on the same market as the editing and QA jobs. An auditing job may be performed by an editor with the auditing attribute set in their profile. An auditing job involves scoring the final transcripts for accuracy. Auditing jobs have their own pay rate scale, though this will not involve proximity to due date, since auditing jobs need not be completed before delivering the transcript to the customer. In some embodiments, the market engine 132 is configured to determine historical editor proficiency using, at least in part, the audit history of the editor. This assessment may also contribute to future market permissions for the editor.

In some embodiments, to periodically measure editor proficiency, the market engine 132 is configured to allow a media file to be edited by multiple editors. For instance, in one example, the market engine 132 periodically creates several different editing jobs from the same media file, and these jobs are claimed and processed by multiple editors. The market engine 132 tracks the underlying media file and does not assign more than one of these jobs to the same editor. After several editors edit the same file, the market engine 132 executes a ROVER or similar process to determine intra-editor agreement, and thereby assign quality scores to individual editors, the quality score being proportional to the number of words in the editor's final transcript, which have high agreement among the other editors. In addition, the market engine 132 may use the ROVER process to produce the final transcript. In this case, the market engine 132 may assign different weights to different editors based on the editor characteristics (domain or customer expertise, historical transcription proficiency, etc).

In other embodiments, the market engine 132 is configured to build cost models that are used to determine predicted costs for editing draft transcriptions. In some of these embodiments, the market engine 132 is configured to generate cost models based on variety of information including historical productivity information, such as times-real-time statistics and ASR distance information. Further, in these embodiments, the cost models may be specific to particular editors, customers or projects. For instance, in one example, the market engine 132 builds cost models that accept a unique identifier for a media file, the ASR information (time-coded draft transcription, lattices, search statistics, acoustic characteristics) for the media file, and an indication of an editor, customer or project associated with the media file and that return a projected transcription cost that is conditioned on historical productivity associated with the editor, customer or project. Once these models are built, the market engine 132 stores them in the media file storage 136.

In some embodiments, customers may be given access to the transcripts for final editing via the customer interface 124. In these embodiments, the market engine 132 uses the customer edits as the gold-standard reference for computing editor accuracy. In other embodiments, the market engine 132 is configured to use times-real-time, stored in the market data storage at the time of job upload, as a factor in determining editor proficiency. Typically, the market engine 132 also adjusts the editing time (and thus the historical editing productivity for editors) by an objective difficulty, such as the ASR distance, because more difficult files will necessarily take longer to edit.

In some embodiments, the customer interface 124 is configured to provide a user interface to the customer 110 via the network 116 and the client computer 104. For instance, in one embodiment, the customer interface 124 is configured to serve a browser-based user interface to the customer 110 that is rendered by a web-browser running on the client computer 104. In this embodiment, the customer interface 124 exchanges customer and media file information with the customer 110 via this user interface. Media file information may include one or more media files or information descriptive of the attributes of one or more media files. Specific examples of media file information include a media file to be transcribed, a type of content included in a media file, a date a transcription of a media file is due, a domain of the subject matter presented in the content, a unique identifier of a media file and storage location of a media file. Media file information is described further below with reference to FIG. 2.

According to an example illustrated by FIG. 1, the customer interface 124 receives media file information from the user interface. This media file information includes a media file and information indicating a date that transcription of the media file is due and a type of content included in the media file. Responsive to receipt of this media file information, the customer interface 124 stores the media files in the media file storage 136 and stores a unique identifier of the media file, the due date, and the content type in the market data storage 134.

According to an example illustrated by FIG. 1, the customer interface 124 receives media file information from the user interface. This media file information includes a media file and media file information indicating a domain of the subject matter of the content included in the media file or a project to be associated with the media file from which the domain may be derived. Responsive to receipt of this media file information, the customer interface 124 stores the media files in the media file storage 136 and stores a unique identifier of the media file and other media file information in the market data storage 134.

According to another example illustrated by FIG. 1, the customer interface 124 provides media file information to the user interface. This media file information includes unique identifiers of one or more media files previously received from the customer 110, the due dates associated with the received media files, and the project information associated with the received media files. In this example, the customer interface 124 receives modifications to the provided media file information made by the customer 110 via the user interface. Responsive to receiving the modifications, the customer interface 124 stores the modifications in the market data storage 134.

According to another example illustrated by FIG. 1, the customer interface 124 provides media file information to the user interface. This media file information includes one or more unique identifiers of one or more media files previously received from the customer 110 and other attributes of these files including, for example, the due dates, content types, prices, difficulties, and statuses or states of jobs associated with the previously received media files. As discussed above with reference to FIG. 8, examples of job states include New, ASR_In_Progress, Available, Assigned, Editing_In_Progress, and Complete. In some embodiments, the customer interface 124 serves media file information as one web page, while in other embodiments, the customer interface 124 serves this media file information as multiple web pages. It is to be appreciated that different due dates and content type may be associated with different prices to the customer. Customer prices may also be impacted by other factors that impact the underlying transcription cost, including how objectively difficult the media file transcription is to edit, as described above.

In another example, the customer interface 124 serves media file information that includes final transcription information to the user interface rendered by the client computer 104. This final transcription information includes a final (time-coded or non-time-coded) transcription of the content included in a media file. The time-coded transcription is comprised of a textual representation of the content of the media file, where each textual token has associated with it indicia of the location in the media file to which it applies. The textual tokens may include words, numerics, punctuation, speaker identification, formatting directives, non-verbal indicators (such as [BACKGROUND NOISE], [MUSIC], [LAUGHTER], [PAUSING]) and other markings that may be useful in describing the media file content. The empty string may also be used as a textual token, in which case the location indicia serves to keep the transcription synchronized with the media file content in the absence of useful textual information. In the case of the draft transcription from the ASR device, these empty-string tokens may be used if the ASR process was confident that some transcription-worthy event has occurred at that location, but is unsure of the particular identity of that event. In this case, having the location indicia associated with the event facilitates synchronized correction by the editor.

In other embodiments, the customer interface 124 is configured to receive a request to edit final transcription information from the user interface, and in response to the request, to provide an editing platform, such as the editing screen described below with reference to the editor interface 126, to the user interface. In this example, the editing platform enables customers to edit the final transcription information. Also, in this example, user interface includes elements that enable the customer 124 to initiate an upload of the edited final transcription information to the customer interface 124. The customer interface, in turn, receives the edited final transcription information, stores the final transcription information in the media file storage 136 and stores an association between the edited final transcription information and the media file with content that was transcribed in the market data storage 134.

Although the examples described above focus on a web-based implementation of the customer interface 124, embodiments are not limited to a web-based design. Other technologies, such as technologies employing a specialized, non-browser based client, may be used to implement the user interface without departing from the scope of the aspects and embodiments disclosed herein. For instance, according to one embodiment, the customer interface 124 is a simple, locally executed upload client that allows the customer to do nothing more than upload media files to the server via FTP or some other protocol.

In other embodiments, the customer interface 124 is configured to perform a variety of processes in response to exchanging information via the user interface. For instance, in one embodiment, after receiving one or more media files via the user interface, the customer interface 124 provides the market engine 132 with an identifier of newly stored, unprocessed media files.

In some embodiments, the administrator interface 130 is configured to provide a user interface to the administrator 114 via the network 120 and the client computer 108. For instance, in one embodiment, the administrator interface 130 is configured to serve a browser-based user interface to the administrator 114 that is rendered by a web-browser running on the client computer 108. In this embodiment, the administrator interface 130 exchanges market information with the administrator 114 via this user interface. Market information may include any information used to maintain the transcription job market and stored within the market data storage 134. Specific examples of market information include a media file information, job information, customer information, editor information and administrator information. Market information is described further below with reference to FIG. 2. Using the administrator interface 130, the administrator 114 acts as a transcription manager who regulates the transcription job market as a whole to promote its efficient allocation of resources.

In these embodiments, the administrator interface 130 is also configured to receive a request from the user interface to provide a preview of a media file, and in response to the request, serve a preview screen for the requested media file to the user interface. This preview screen provides the content of the media file and the draft transcription associated with the media file. More particular, in some embodiments, the preview screen is configured to provide the media file content, in the form of, for example, a streamed version of the original file, as well as the draft transcription information for the media file, which includes time-codes. This information enables the preview screen to display the draft transcription in synchronization with the media file content. A preview may consist of all or some of this information.

According to an example illustrated by FIG. 1, the administrator interface 130 provides media file information to the user interface. This media file information includes one or more unique identifiers of one or more media files previously received from the customer 110, the content types associated with the received media files and the difficulties associated with the received media files. In this example, responsive to receipt of an indication that the administrator 114 wishes to preview a media file, the administrator interface 130 provides a preview of the media file and the draft transcription information associated with the media file. Further, in this example, the administrator interface 130 receives modifications to the provided media file information made by the administrator 114 via the user interface. Responsive to receiving the modifications, the administrator interface 130 stores the modifications in the market data storage 134.

In other embodiments, the administrator interface 130 is also configured to receive a request from the user interface to provide an administrator view of all jobs available on the market, and in response to the request, serve an administrator screen to the user interface. This administrator view is configured to display the same information available to editors viewing the job market (difficulty, pay-rate, due-date, domain, etc.), and also displays additional information to assist the administrator. For example, the administrator view may display the number of editors with permission to edit each available media file, the amount of time each job has been on the market, the number of previews of the media file, and other data concerning the market status of the media file. In this way, the administrator view displays information that enables administrators to ensure that the media file is accepted as an editing job.

The administrator interface 130 is also configured receive a request from the user interface to modify information displayed by administrator view, and in response to the request, store the modified information. Thus, the administrator view may increase the pay rate, may manually enable a larger number (or smaller number) of editors access to the file, or may cut the file into shorter segments—thus producing several editing jobs for the same media file. The administrator view may also bundle jobs together to ensure that all editors have access to a reasonable cross-section of work. For example, the administrator view may group a selection of jobs with variable difficulty together so that a single editor would need to accept all of these jobs, instead of just picking low difficulty jobs for themselves. The administrator view may also throttle the supply of low difficulty jobs in order to create a more competitive environment or to induce editors to work on difficult jobs. The administrator view may also record as accepted a claim offer that is higher than the pay rate for a job.

In other embodiments, the administrator interface 130 is also configured to receive a request from the user interface to provide a meta rules view, and in response to the request, serve a meta rules screen to the user interface. Meta rules globally modify the behavior of the market by affecting how all or some of the available jobs will appear on the market. In some embodiments, the administrator interface 130 is configured receive a request from the user interface to add to or modify meta rules displayed by meta rules view, and in response to the request, store the newly introduced meta rule information.

In other embodiments, the administrator interface 130 is also configured to receive a request from the user interface to provide a market view of jobs available on the market, and in response to the request, serve a market screen to the user interface. The market screen is configured to provide summarized information about jobs organized according to one or more job (or associated media file) attributes. For instance, one example of the market screen displays all of the jobs assigned to one or more editors. In another example, the market screen displays all jobs organized by due date in the form of a calendar. In yet another example, the market screen displays all jobs belonging to a particular customer.

Although the examples described above focus on a web-based implementation of the administrator interface 130, embodiments are not limited to a web-based design. Other technologies, such as technologies employing a specialized, non-browser based client, may be used without departing from the scope of the aspects and embodiments disclosed herein.

In some embodiments, the editor interface 126 is configured to provide a user interface to the editor 112 via the network 118 and the client computer 106. For instance, in one embodiment, the editor interface 126 is configured to serve a browser-based user interface to the editor 112 that is rendered by a web-browser running on the client computer 106. In this embodiment, the editor interface 126 exchanges media file information, editor information and job information with the editor 112 via this user interface. Editor information may include information associated with an editor profile or the history of an editor within the transcription job market. Job information may include information associated with transcription jobs that are available or that have been completed via the transcription job market. Specific examples of editor information include a unique identifier of the editor, domains of subject matter in which the editor is qualified to work, and identifiers of currently claimed jobs. Specific examples of job information include a unique identifier of the job, a deadline for the job, and a pay rate for the job. Media file information, editor information and job information are described further below with reference to FIG. 2.

In these embodiments, the editor interface 126 is configured to provide job information only for jobs that the editor 112 is permitted to work. In one example, the editor interface 126 determines that an editor is permitted to edit a draft transcription based on a complex of factors. If a media file associated with the draft transcription has a specific content type, then in some examples, the editor interface 126 will only provide job information associated with the media file to editors qualified to edit that specific content type. In other examples, the editor interface 126 may provide job information associated with more difficult files to more experienced editors. In still other examples, the editor interface 126 provides job information for jobs associated with specific customers to particular subset of editors. This approach may be advantageous, for example, if there are confidentiality concerns and only that subset of editors have signed non-disclosure agreements. Thus, examples of the editor interface 126 do not provide job information to the editor 112 for jobs claimed by another editor or for jobs that the editor 112 does not have permission to claim.

In other embodiments, the editor interface 126 is configured to receive a request from the user interface to provide a preview of a media file, and in response to the request, serve a preview screen for the requested media file to the user interface. This preview screen provides the content of the media file and the draft transcription information associated with the media file. Editors may be given access to the preview screen for a media file before they choose to accept the editing job at the given pay rate. The preview screen includes the media file content, in the form of, for example, a streamed version of the original media file, as well as the draft transcription information for the media file, which includes time-codes. This information enables the preview screen to display and draft transcription in synchronization with playback of the media file content. A preview may consist of all or some of this content. The editors may access the preview screen content and thereby assess for themselves the difficulty of the editing job, and then make a judgment as to whether they are willing to accept the job at the current pay rate. This enables editors to select content that they are interested in and to reveal their expertise or preferences for subject matter that would otherwise by unknown to administrators. In aggregate this will tend to improve transcription quality since the jobs will be better matched to editors than if randomly assigned.

According to an example illustrated by FIG. 1, the editor interface 126 provides job information to the user interface. This job information includes one or more unique identifiers of one or more jobs available for the editor 112, identifiers of the media files associated with the jobs, pay rates of the jobs, domain information, and durations of the content of the media file associated with the job. In this example, responsive to receipt of an indication that the editor 112 wishes to preview a media file, the editor interface 126 provides a preview of the media file and the draft transcription information associated with the media file. If the editor 112 wishes to claim the job, the editor 112 indicates this intent by interacting with the user interface and the user interface transmits a request to claim the job for the editor 112 to the editor interface 126. Next, in this example, the editor interface 126 receives the request to claim an available job from the user interface, and responsive to receiving this request, the editor interface 126 records the job as claimed in the market data storage 134.

In other embodiments, the editor interface 126 is configured to receive a request from the user interface to edit a draft transcription, and in response to the request, serve an editing screen to the user interface. The editing screen is configured to provide a variety of tools for editing and correcting the draft transcription. For instance, the editing screen provides access to the original file (or a converted version of the original file) along with the draft transcription information by referencing information contained in both the market data storage 134 and the media file storage 136.

In one embodiment, once an editor begins working on a job, the editing screen provides the complete media file content and time-coded draft transcription information for editing using client-computer-based editing software. The editor interface 126 also transitions the job into a working state by recording the working state for the job in the market data storage 134.

The editing process consists of playing the media file content, and following along with the draft transcription, modifying the draft transcription information as necessary to ensure that the saved draft transcription reflects the content of the media file. According to some embodiments, as the editor modifies the draft transcription information, the editing screen communicates with the editor interface 126 to indicate progress through the editing job. The editing screen tracks the time point into the file that the editor is playing, as well as the parts of the draft transcription information that has been modified in order to estimate progress. The progress is communicated back to the editor interface 126, and the editor interface 126 then stores this progress in the market data storage 134 in association with the editing job.

In the course of editing a job, the editor may come across words or phrases that are difficult to understand. The editing screen allows editors to flag these regions, so that they may be reviewed and possibly corrected by an administrator. A flag may indicate complete unintelligibility or may include a guess as to the correct word, but with an indicator that it is a guess. For each job, the prevalence of corrected flags in the edited transcript is stored in the market data storage 134, and the market engine 132 may use stored flags as an indicator of editor proficiency to aid with future job assignment.

In other embodiments, the editor interface 126 is configured to receive a request from the user interface to save an edited draft transcription, and in response to the request, save the edited draft transcription to the media file storage 136 and update progress information for the job in the market data storage 134. In some embodiments, saving the progress information triggers estimation of a new completion date, which is then evaluated relative to the due date as discussed with reference to FIG. 6 below.

According to an example illustrated by FIG. 1, the editor interface 126 provides job information to the user interface. This job information includes one or more unique identifiers of one or more jobs available for the editor 112, identifiers of the media files associated with the jobs, pay rates of the jobs, durations of the content of the media file associated with the job and progress the editor 112 has made editing the draft transcription associated with the job. In this example, responsive to receipt of an indication that the editor 112 wishes to edit the draft transcription, the editor interface 126 serves an editing screen to the user interface.

In some embodiments, the editing screen is configured to receive an indication that the editor has completed a job. In these embodiments, the editing screen is also configured to, in response to receiving the indication, store the edited draft transcription information as final transcription information in the media file storage 136 and update the market data storage 134 to include an association between the media file and the final transcription information.

The examples described above focus on a web-based implementation of the editor interface 126. However, embodiments are not limited to a web-based design. Other technologies, such as technologies employing a specialized, non-browser based client, may be used without departing from the scope of the aspects and embodiments disclosed herein.

Each of the interfaces disclosed herein may both restrict input to a predefined set of values and validate any information entered prior to using the information or providing the information to other components. Additionally, each of the interfaces disclosed herein may validate the identity of an external entity prior to, or during, interaction with the external entity. These functions may prevent the introduction of erroneous data into the transcription system 100 or unauthorized access to the transcription system 100.

Figure 2:
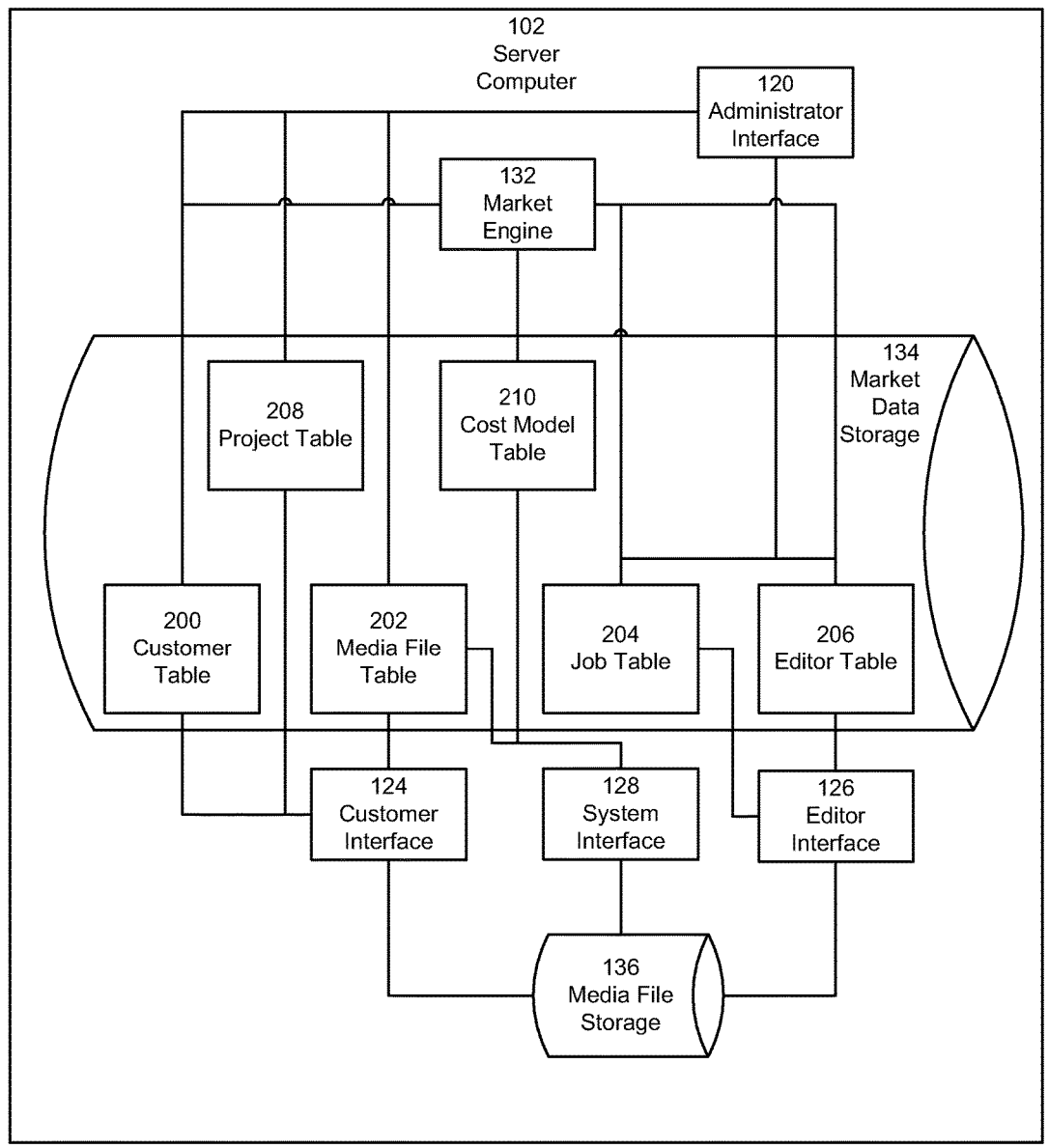
FIG. 2 is a schematic diagram of the server computer shown in FIG. 1.

FIG. 2 illustrates the server computer 102 of FIG. 1 in greater detail. As shown in FIG. 2, the server computer 102 includes the market engine 132, the market data storage 134, the customer interface 124, the system interface 128, the editor interface 126 and the media file storage 136. In the embodiment illustrated in FIG. 2, the market data storage 134 includes a customer table 200, a media file table 202, a job table 204, an editor table 206, a project table 208 and a cost model table 210.

In the embodiment of FIG. 2, the customer table 200 stores information descriptive of the customers who employ the transcription job market to have their media files transcribed. In at least one embodiment, each row of the customer table 200 stores information for a customer and includes an customer_id field, and a customer_name field. The customer_id field stores an identifier of the customer that is unique within the transcription job market. The customer_name field stores information that represents the customer's name within the transcription job market. The customer_id is used as a key by a variety of functions disclosed herein to identify information belonging to a particular customer.

The media file table 202 stores information descriptive of the media files that have been uploaded to the transcription job market for transcription. In at least one embodiment, each row of the media file table 202 stores information for one media file and includes the following fields: file_id, customer_id, state, duration, due_date, difficulty, domain, ASR_cost, proposed_pay_rate, ASR_transcript_location, edited_transcript_location, and QA_transcript_location. The file_id field stores a unique identifier of the media. The customer_id field stores a unique identifier of the customer who provided the media file. The state field stores information that represents the state of the media file. The duration field stores information that represents the duration of the content of the media file. The due_date field stores information that represents the date by which the customer requires a transcription be complete. The difficulty field stores information that represents an assessed difficulty of completing a transcription of the media file. The domain field stores information that identifies a subject matter domain to which the media file belongs. The ASR_cost field stores information that represents a predicted cost of transcribing the media file as assessed using draft transcription information. The proposed_pay_rate field stores information that represents a pay rate proposed using draft transcription information. The ASR_transcript_location field stores an identifier of a location of draft transcript information associated with the media file. The edited_transcript_location field stores an identifier of a location of edited draft transcript information associated with the media file. The QA_transcript_location field stores an identifier of a location of QA draft transcript information associated with the media file. The file_id is used as a key by a variety of functions disclosed herein to identify information associated with a particular media file.

The job table 204 stores information descriptive of the jobs to be completed within the transcription job market. In at least one embodiment, each row of the job table 204 stores information for one job and includes the following fields: job_id, file_id, deadline, state, job_type, pay_rate, editor_id, progress, flags, XRT, corrections, audit_score, hide, ASR_distance. The job_id field stores an identifier of the job that is unique within the transcription job market. The file_id field stores the unique identifier of the media file to be transcribed by an editor working the job. The deadline field stores information that represents the date by which the job must be complete. The state field store the current state (or status) of the job. Examples values for the state field include New, ASR_In_Progress, Available, Assigned, Editing_In_Progress, and Complete. The job_type field stores information that represents a type of work that must be performed to complete the job, for example editing, QA, auditing, etc. The pay_rate field stores information that represents a pay rate for completing the job. The editor_id field stores the unique identifier of the editor who has claimed this job. The progress field stores information that represents an amount of work completed for the job. The flags field stores information that represents the number and type of flags assigned to the job during editing, as described above. The XRT field stores information that represents the times-real-time statistic applicable to the job. The corrections field stores information that represents corrections made to the draft transcription as part of the job. The audit_scores field stores information that represents the results of auditing the job. The hide field stores information that determines whether components, such as the market engine 132 and the editor interface 126, should filter out the job from job views. The ASR_distance field stores information that represents the number of changes from the draft transcription made as part of the job. The job_id is used as a key by a variety of functions disclosed herein to identify information associated with a particular job.

The editors table 206 stores information descriptive of the editors who prepare transcriptions within the transcription job market. In at least one embodiment, each row of the editors table 206 stores information for one editor and includes the following fields: editor_id, roles, reward_points, domains, and special_capabilities. The editor_id field stores an identifier of the editor that is unique within the transcription job market. The roles field stores information representative of roles that the editor is able to assume with the transcription job market, for example, editor, QA, auditor, etc. Examples of these roles include editor, quality assurance editor, and auditor. The reward_points field stores information that represent the number of reward points accumulated by the editor. The domains field stores information that represents subject matter domains of media files that the editor has permission to edit. The special_capabilities field stores information that represents specialized skills that the editor possesses. The editor_id is used as a key by a variety of functions disclosed herein to identify information belonging to a particular editor.

In the embodiment of FIG. 2, the project table 208 stores information descriptive of projects that the transcription job market is being utilized to complete. In at least one embodiment, each row of the project table 208 stores information for a project and includes an project_id field, a project_name field, a customer_id field, and a domain field. The project_id field stores information that identifies a group of media files that belong to a project. The project_name field stores information that represents the project's name within the transcription job market. The customer_id field indicates the customer to whom the project belongs. The domain field stores information that identifies a subject matter domain of media files included in the project. The project_id is used as a key by a variety of functions disclosed herein to identify information grouped into a particular project.

In the embodiment of FIG. 2, the cost model table 210 stores information descriptive of one or more cost models used to predict the cost of editing the content included media files. In at least one embodiment, each row of the cost model table 210 stores information representative of a cost model and includes an editor_id field, a customer_id field, a project_id field and a Cost_Model_Location field. The editor_id field stores the unique identifier of an editor to whom the cost model applies. The customer_id field stores the unique identifier of a customer to whom the cost model applies. The project_id field stores the unique identifier of a project to which the cost model applies. The Cost_Model_Location field stores information identifying a location of the cost model. The editor_id, customer_id or project_id, any of which may be null or the wildcard indicator, may be used as a key by a variety of functions disclosed herein to identify a location of a cost model applicable to any of these entities.

Various embodiments implement the components illustrated in FIG. 2 using a variety of specialized functions. For instance, according to some embodiments, the customer interface 124 uses a File_Upload function and a File_Update function. The File_Upload function uploads a file stored on a customer's computer to the server computer 102 and accepts parameters including customer_id, project_id, filename, and optionally, domain. The customer_id parameter identifies the customer's unique customer_id. The project_id identifies the project to which the media file belongs. The filename parameter specifies the name of the media file to be uploaded by the customer interface 124. The domain parameter specifies the subject matter domain to which the media file belongs. In at least one embodiment, if the domain parameter is not specified, the market engine 132 determines the value of the domain parameter from the value of the domain field of a record stored within the project table 208 that has a project_id field that is equal to the project_id parameter.

In other embodiments, the File_Update function updates an attribute of a media file record and accepts parameters including file_id, attribute, and value. The file_id parameter identifies the media file record with attributes that will be modified as a result of execution of the File_Update function. The attribute parameter identifies an attribute to be modified. In at least one embodiment, this attribute may be the domain, difficulty or state of the media file, as stored in the media file table 202. The value parameter specifies the value to which the attribute is to be set as a result of executing the File_Update function.

In other embodiments, the system interface 128 uses a File_Send_to_ASR function and a File_Create_Draft function. The File_Send_to_ASR function provides a media file to the ASR device 122 and causes the ASR device 122 to perform automatic speech recognition on the content included in the media file. The File_Send_to_ASR function accepts parameters including file_id. The file_id parameter identifies the media file to be processed by the ASR device 122.

In other embodiments, the File_Create_Draft function creates draft transcription information for a media file and accepts parameters including file_id and ASR_output. The file_id parameter identifies the media file for which the draft transcription information will be created by execution of the File_Create_Draft function. The ASR_output parameter specifies the location of the ASR output generated by the ASR device 122 during its processing of the media file.

In other embodiments, the market engine 132 uses the following functions: File_Assess_Difficulty, File_Propose_Pay_Rate, File_Compute_Actual_Difficulty, Job_Create, Job_Split, Job_Adjust_Parameter and Job_Revoke. The File_Assess_Difficulty function determines an estimated difficulty to transcribe the content included in a media file and accepts parameters including a file_id. The file_id parameter identifies the media file including the content for which difficulty is being accessed.

In other embodiments, the File_Propose_Pay_Rate function determines an initial pay rate for transcribing the content included in a media file and accepts parameters including file_id and draft_transcription_information. The file_id parameter identifies the media file for which the proposed_pay_rate that will be determined as a result of execution of the File_Propose_Pay_Rate function. The draft_transcription_information parameter specifies the location of the draft transcription information associated with the media file. The File_Propose_Pay_Rate function determines the initial pay rate using the information included in the draft transcription information.

In other embodiments, the File_Compute_Actual_Difficulty function determines an actual difficulty of transcribing the content included in a media file and accepts parameters including file_id (from which it determines the location of the draft_transciption_information and final_transcription_information from the media file table 202. The file_id parameter identifies the media file for which the actual difficulty will be determined as a result of execution of the File_Compute_Actual_Difficulty function. The File_Compute_Actual_Difficulty function determines the actual difficulty by comparing the content of the draft transcription included in the draft transcription information to the content of the final transcription included in the final transcription information. In one embodiment, File_Compute_Actual_Difficulty function uses the number of corrections performed on the transcription to compute a standard distance metric, such as the Levenshtein distance. The File_Compute_Actual_Difficulty function stores this measurement in the ASR_distance field of the job table 204.

In other embodiments, the Job_Create function creates a job record and stores the job record in the job table 204. The Job_Create function and accepts parameters including file_id, job_type, pay_rate and, optionally, deadline. The file_id parameter identifies the media file for which the job is being created. The job_type parameter specifies the type of editing work to be performed by an editor claiming the job. The pay_rate parameter specifies the amount of pay an editor completing the job will earn. The deadline parameter specifies the due date for completing the job.

In other embodiments, the Job_Split function segments a job into multiple jobs and accepts parameters including job_id and a list of timestamps. The job_id parameter identifies the job to be segmented into multiple jobs. The list of timestamps indicates the location in the media file at which to segment the media file to create new jobs.

In other embodiments, the Job_Adjust_Attribute function modifies the value of an attribute stored in a job record and accepts parameters including job_id, attribute and value. The job_id parameter identifies the job record with an attribute to be modified. The attribute parameter identifies an attribute to be modified. In at least one embodiment, this attribute may be the pay_rate, deadline, XRT, ASR_distance or audit_score of the job record, as stored in the job table 204. The value parameter specifies the value to which the attribute is to be set as a result of executing the Job_Adjust_Attribute function.

In other embodiments, the Job_Revoke function removes a job from an editor and makes the job available for other editors to claim according to the current market rules. The Job_Revoke function accepts parameters including job_id. The job_id parameter identifies the job to be revoked.

In other embodiments, the editor interface 126 uses the following functions: Job_Store_Output, Job_Update_Progress, Job_List_Available, Job_Preview, Job_Claim, and Job_Begin. The Job_Store_Output function stores the current version of the edited draft transcription and accepts parameters including a job_id. The job_id parameter identifies the job for which the current version of the edited draft transcription is being stored.

In other embodiments, the Job_Update_Progress function updates the progress attribute included in a job record and saves the current state of the transcription. The Job_Update_Progress function accepts parameters including job_id, transcription data and progress. The job_id parameter identifies the job record for which the progress attribute will be updated to the value specified by the progress parameter. The transcription data is saved to the location specified in the media file record associated with the job_id.

In other embodiments, the Job_List_Available function returns a list of jobs available to an editor and accepts parameters including editor_id, and optionally, job_type, domain, difficulty, deadline, and proposed_pay_rate. The editor_id parameter identifies the editor for which the list of available jobs is being created. The job_type parameter specifies a job_type to which each job in the list of available jobs must belong. The domain parameter specifies a domain to which each job in the list of available jobs must belong. The difficulty parameter specifies a difficulty that the media file associated with the job in the list must have. The deadline parameter specifies a deadline that each job in the list of available jobs must have. The proposed_pay_rate parameter specifies a proposed_pay_rate that the media file associated with the job must have. It is to be appreciated that meta rules, may also impact the list of jobs returned by the Job_List_Available function.

In other embodiments, the Job_Preview function causes a preview screen to be provided to a user interface and accepts parameters including editor_id and job_id. The editor_id parameter identifies the editor for which the preview is being provided. The job_id parameter specifies the job that is being previewed.

In other embodiments, the Job_Claim function records a job as claimed and accepts parameters including editor_id and job_id. The editor_id parameter identifies the editor for which the job is being claimed. The job_id parameter specifies the job that is being claimed.

In other embodiments, the Job_Begin function causes an editing screen to be provided to a user interface and accepts parameters including job_id. The job_id parameter specifies the job associated with the draft transcription to be edited.

Embodiments of the transcription system 100 are not limited to the particular configuration illustrated in FIGS. 1 and 2. Various examples utilize a variety of hardware components, software components and combinations of hardware and software components configured to perform the processes and functions described herein. In some examples, the transcription system 100 is implemented using a distributed computer system, such as the distributed computer system described further below with regard to FIG. 3.

Computer System

As discussed above with regard to FIG. 1, various aspects and functions described herein may be implemented as specialized hardware or software components executing in one or more computer systems. There are many examples of computer systems that are currently in use. These examples include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Further, aspects may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, examples are not limited to executing on any particular system or group of systems. Further, aspects and functions may be implemented in software, hardware or firmware, or any combination thereof. Thus, aspects and functions may be implemented within methods, acts, systems, system elements and components using a variety of hardware and software configurations, and examples are not limited to any particular distributed architecture, network, or communication protocol.

Figure 3:
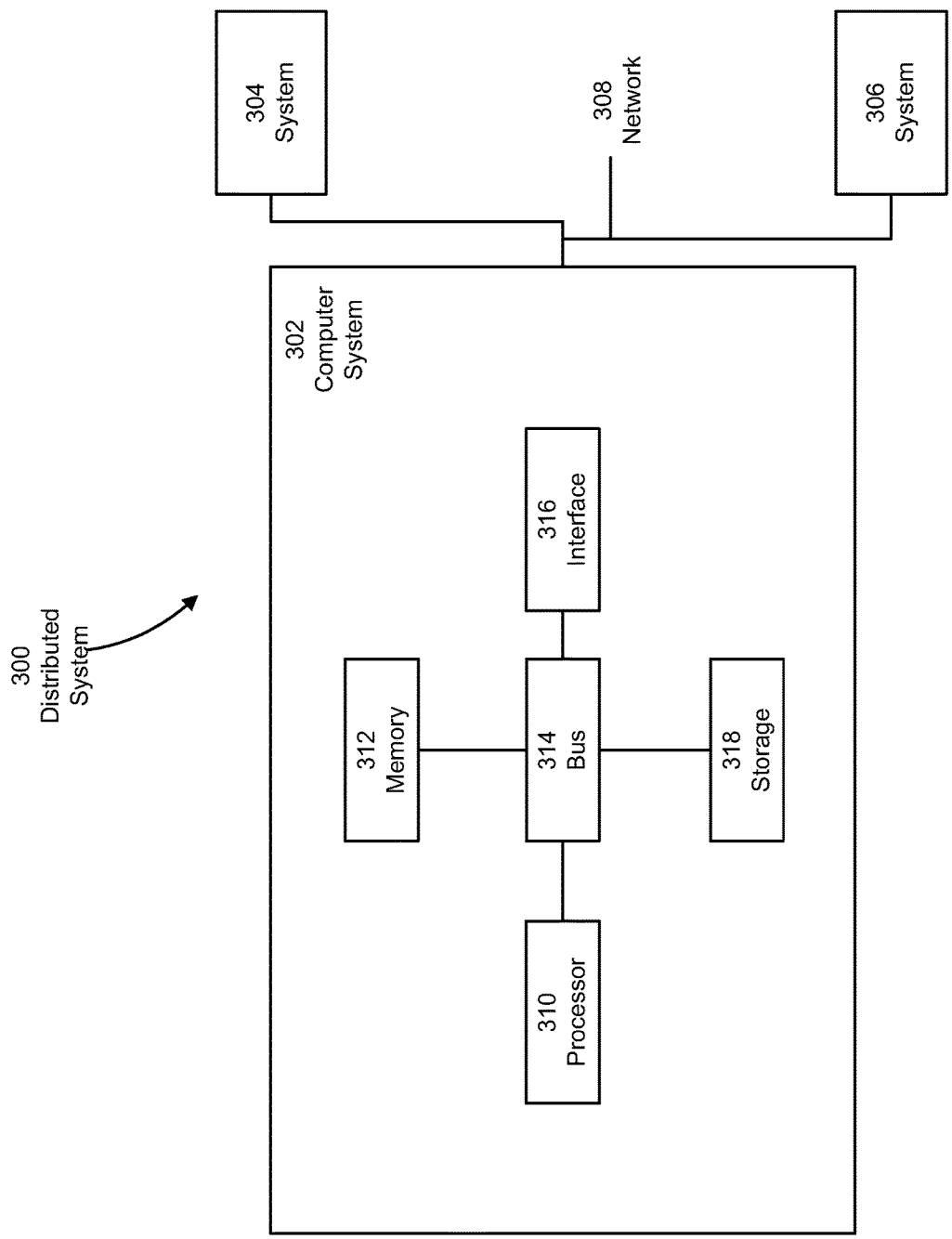
FIG. 3 is a schematic diagram of one example of a computer system that may perform processes and functions disclosed herein.

Referring to FIG. 3, there is illustrated a block diagram of a distributed computer system 300, in which various aspects and functions are practiced. As shown, the distributed computer system 300 includes one more computer systems that exchange information. More specifically, the distributed computer system 300 includes computer systems 302, 304 and 306. As shown, the computer systems 302, 304 and 306 are interconnected by, and may exchange data through, a communication network 308. The network 308 may include any communication network through which computer systems may exchange data. To exchange data using the network 308, the computer systems 302, 304 and 306 and the network 308 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST and Web Services. To ensure data transfer is secure, the computer systems 302, 304 and 306 may transmit data via the network 308 using a variety of security measures including, for example, TLS, SSL or VPN. While the distributed computer system 300 illustrates three networked computer systems, the distributed computer system 300 is not so limited and may include any number of computer systems and computing devices, networked using any medium and communication protocol.

As illustrated in FIG. 3, the computer system 302 includes a processor 310, a memory 312, a bus 314, an interface 316 and data storage 318. To implement at least some of the aspects, functions and processes disclosed herein, the processor 310 performs a series of instructions that result in manipulated data. The processor 310 may be any type of processor, multiprocessor or controller. Some exemplary processors include commercially available processors such as an Intel Xeon, Itanium, Core, Celeron, or Pentium processor, an AMD Opteron processor, a Sun UltraSPARC or IBM Power5+ processor and an IBM mainframe chip. The processor 310 is connected to other system components, including one or more memory devices 312, by the bus 314.

The memory 312 stores programs and data during operation of the computer system 302. Thus, the memory 312 may be a relatively high performance, volatile, random access memory such as a dynamic random access memory (DRAM) or static memory (SRAM). However, the memory 312 may include any device for storing data, such as a disk drive or other non-volatile storage device. Various examples may organize the memory 312 into particularized and, in some cases, unique structures to perform the functions disclosed herein. These data structures may be sized and organized to store values for particular data and types of data.

Components of the computer system 302 are coupled by an interconnection element such as the bus 314. The bus 314 may include one or more physical busses, for example, busses between components that are integrated within a same machine, but may include any communication coupling between system elements including specialized or standard computing bus technologies such as IDE, SCSI, PCI and InfiniBand. The bus 314 enables communications, such as data and instructions, to be exchanged between system components of the computer system 302.

The computer system 302 also includes one or more interface devices 316 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 302 to exchange information and to communicate with external entities, such as users and other systems.

The data storage 318 includes a computer readable and writeable nonvolatile, or non-transitory, data storage medium in which instructions are stored that define a program or other object that is executed by the processor 310. The data storage 318 also may include information that is recorded, on or in, the medium, and that is processed by the processor 310 during execution of the program. More specifically, the information may be stored in one or more data structures specifically configured to conserve storage space or increase data exchange performance. The instructions may be persistently stored as encoded signals, and the instructions may cause the processor 310 to perform any of the functions described herein. The medium may, for example, be optical disk, magnetic disk or flash memory, among others. In operation, the processor 310 or some other controller causes data to be read from the nonvolatile recording medium into another memory, such as the memory 312, that allows for faster access to the information by the processor 310 than does the storage medium included in the data storage 318. The memory may be located in the data storage 318 or in the memory 312, however, the processor 310 manipulates the data within the memory, and then copies the data to the storage medium associated with the data storage 318 after processing is completed. A variety of components may manage data movement between the storage medium and other memory elements and examples are not limited to particular data management components. Further, examples are not limited to a particular memory system or data storage system.

Although the computer system 302 is shown by way of example as one type of computer system upon which various aspects and functions may be practiced, aspects and functions are not limited to being implemented on the computer system 302 as shown in FIG. 3. Various aspects and functions may be practiced on one or more computers having a different architectures or components than that shown in FIG. 3. For instance, the computer system 302 may include specially programmed, special-purpose hardware, such as an application-specific integrated circuit (ASIC) tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 302 may be a computer system including an operating system that manages at least a portion of the hardware elements included in the computer system 302. In some examples, a processor or controller, such as the processor 310, executes an operating system. Examples of a particular operating system that may be executed include a Windows-based operating system, such as, Windows NT, Windows 2000 (Windows ME), Windows XP, Windows Vista or Windows 7 operating systems, available from the Microsoft Corporation, a MAC OS System X operating system available from Apple Computer, one of many Linux-based operating system distributions, for example, the Enterprise Linux operating system available from Red Hat Inc., a Solaris operating system available from Sun Microsystems, or a UNIX operating systems available from various sources. Many other operating systems may be used, and examples are not limited to any particular operating system.

The processor 310 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, or C# (C-Sharp). Other object-oriented programming languages may also be used. Alternatively, functional, scripting, or logical programming languages may be used.

Additionally, various aspects and functions may be implemented in a non-programmed environment, for example, documents created in HTML, XML or other format that, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements, e.g. specialized hardware, executable code, data structures or objects, that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

Transcription System Processes

Figure 4:
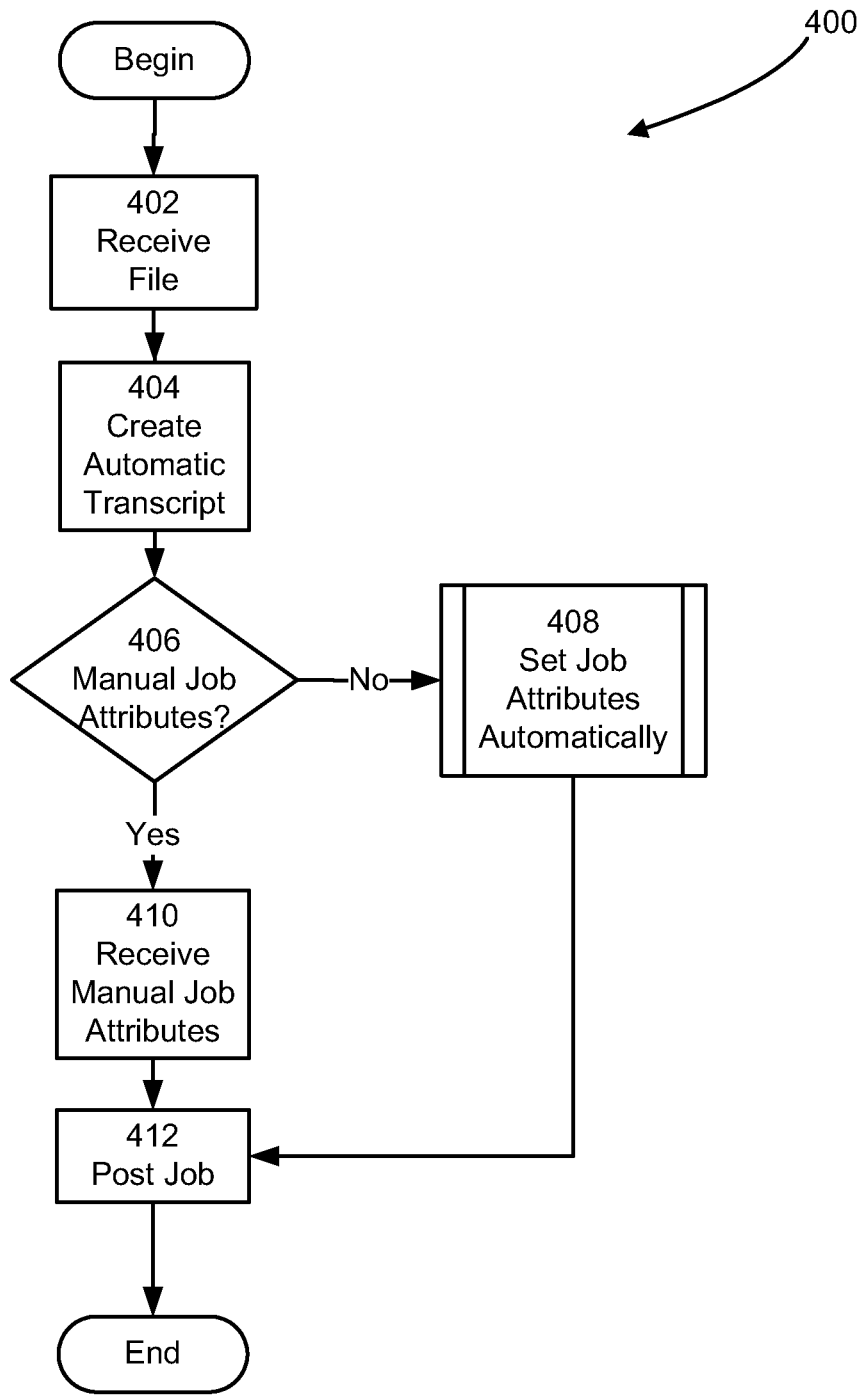
FIG. 4 is a flow diagram illustrating a process for creating a transcription job.

Some embodiments perform processes that add jobs to a transcription job market using a transcription system, such as the transcription system 100 described above. One example of such a process is illustrated in FIG. 4. According to this example, a process 400 includes acts of receiving a media file, creating an ASR transcription, receiving job attributes, setting job attributes automatically and posting a job.

In act 402, the transcription system receives a media file including content to be transcribed. Next, in act 404, the transcription system uses an ASR device to produce an automatic transcription and associated information. After the automatic transcription is created, the transcription system determines whether attributes for a job to be associated with the media file will be set manually in act 406. If so, the transcription system receives the manually entered job attributes in act 410. Otherwise, the transcription system executes a process that sets the job attributes automatically in act 408. This process is described further below with reference to FIG. 7. Once the job attributes have been set, the transcription system posts the job in act 412, and the process 400 ends.

Figure 5:
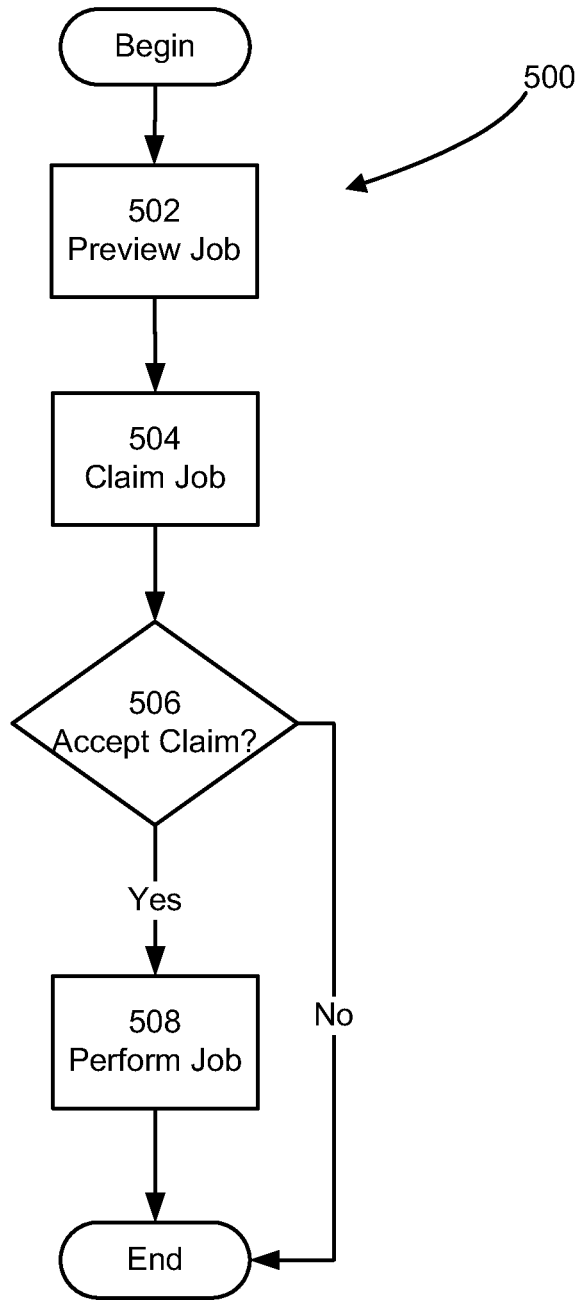
FIG. 5 is a flow diagram illustrating a process for editing a transcription job.

Other embodiments perform processes that allow and editor to perform a job listed on the transcription job market using a transcription system, such as the transcription system 100 described above. One example of such a process is illustrated in FIG. 5. According to this example, a process 500 includes acts of previewing a job, claiming a job and completing a job.

In act 502, the transcription system receives a request to provide a preview of a job. In response to this request, the transcription system provides a preview of the job. The preview includes a preview of the content included in the media file associated with the job and draft transcription information for an ASR generated transcription that is associated with the media file. The preview may also include job attributes such as pay rate, domain, duration, and difficulty.

Next, in act 504, the transcription system receives a request to claim the job. In response to this request, the transcription system determines whether to accept the claim using the processes disclosed herein. If the claim is not accepted, the process 500 ends. If the claim is accepted, the process 500 executes act 508.

In the act 508, the transcription system receives a request to perform the job. In response to this request, the transcription system provides a user interface and tools that enable an editor to perform work. While the editor is performing the work, the transcription system monitors progress and periodically saves work in process. Upon receipt of an indication that the editor has completed the job, the transcription system saves the completed job, and the process 500 ends.

Figure 6:
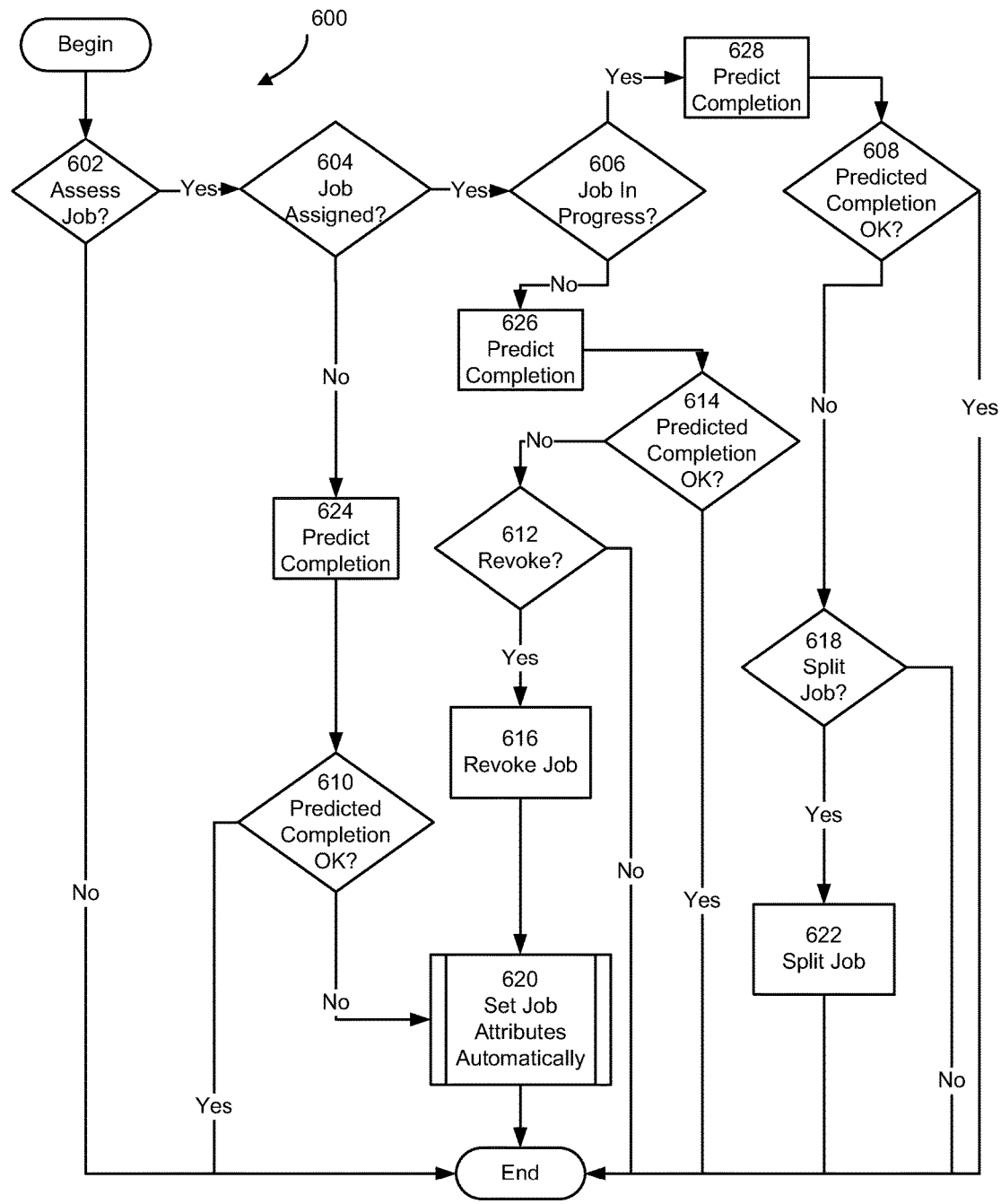
FIG. 6 is a flow diagram illustrating a process for calibrating a job.

Other embodiments perform processes that monitor jobs to ensure the jobs are completed according to schedule using a transcription system, such as the transcription system 100 described above. One example of such a process is illustrated in FIG. 6. According to this example, a process 600 includes several acts that are described further below.

In act 602, the transcription system determines whether a job should be assessed for attribute adjustment. The transcription system may make this determination based on a variety of factors including receipt of a request to assess the job from a component of the system or an entity external to the system or expiration of a predetermined period of time since the job was previously assessed, i.e., a wait time. If the job should not be assessed, the process 600 ends. Otherwise, the process 600 executes act 604.

In the act 604, the transcription system determines whether the job is assigned. If so, the transcription system executes act 624. Otherwise, the transcription system determines whether the job is in progress in act 606. If not, the transcription system executes act 626. Otherwise, the transcription system executes the act 628.

In the acts 624, 626 and 628, the transcription system predicts the completion date of the job using one or more of the following factors: the current date, the amount of progress already complete for the job; historical productivity of the editor (in general or, more specifically, when editing media files having a characteristic in common with the media file associated with the job); the number of jobs currently claimed by the editor; the number of jobs the editor has in progress; and the due dates of the jobs claimed by the editor.

In some embodiments, the following equation is used to predict the completion date of the job:

$$Tc = To + [(1-Pj)*Dj*Xe] + [K1*Fc*Dc*Xc] + [K2*Fp*Dp*Xp]$$

Where,

Tc is the predicted completion time of the job

To is the current time

Pj is the progress on the job, expressed as a decimal fraction

Xe is the times-real-time-statistic for the editor, either the general statistic or the conditional statistic as determined by the job characteristics Xc is the times-real-time-statistic for the editor, either the general statistic or the conditional statistic as determined by the claimed job characteristics, taken as a whole Xp is the times-real-time-statistic for the editor, either the general statistic or the conditional statistic as determined by the in-progress job characteristics, taken as a whole Dj is the duration of the job Dc is the duration of the claimed but not yet in-progress jobs Dp is the duration of the in-progress jobs Fc is the fraction of the total claimed job duration accounted for by jobs which have a due date earlier than that of the current job Fp is the fraction of the total in-progress jobs duration accounted for by jobs which have a due date earlier than the current job K1 and K2 are tunable constants In act 608, the transcription system determines whether the predicted completion date of the job is before the due date of the job. If so, the process 600 ends. Otherwise, the transcription system executes act 618.

In act 610, the transcription system determines whether the predicted completion date of the job is before the due date of the job. If so, the process 600 ends. Otherwise, the transcription system executes a process that sets the job attributes automatically in act 620. This process is described further below with reference to FIG. 7. Once the job attributes have been set, the process 600 ends.

In act 614, the transcription system determines whether the predicted completion date of the job is before the due date of the job. If so, the process 600 ends. Otherwise, the transcription system determines whether to revoke the job in act 612. If not, the process 600 ends. Otherwise, the transcription system revokes the job in act 616.

In act 618, the transcription system determines whether to split the job. If not, the process 600 ends. Otherwise, the transcription system splits the job in act 622, and the process 600 ends.

Figure 7:
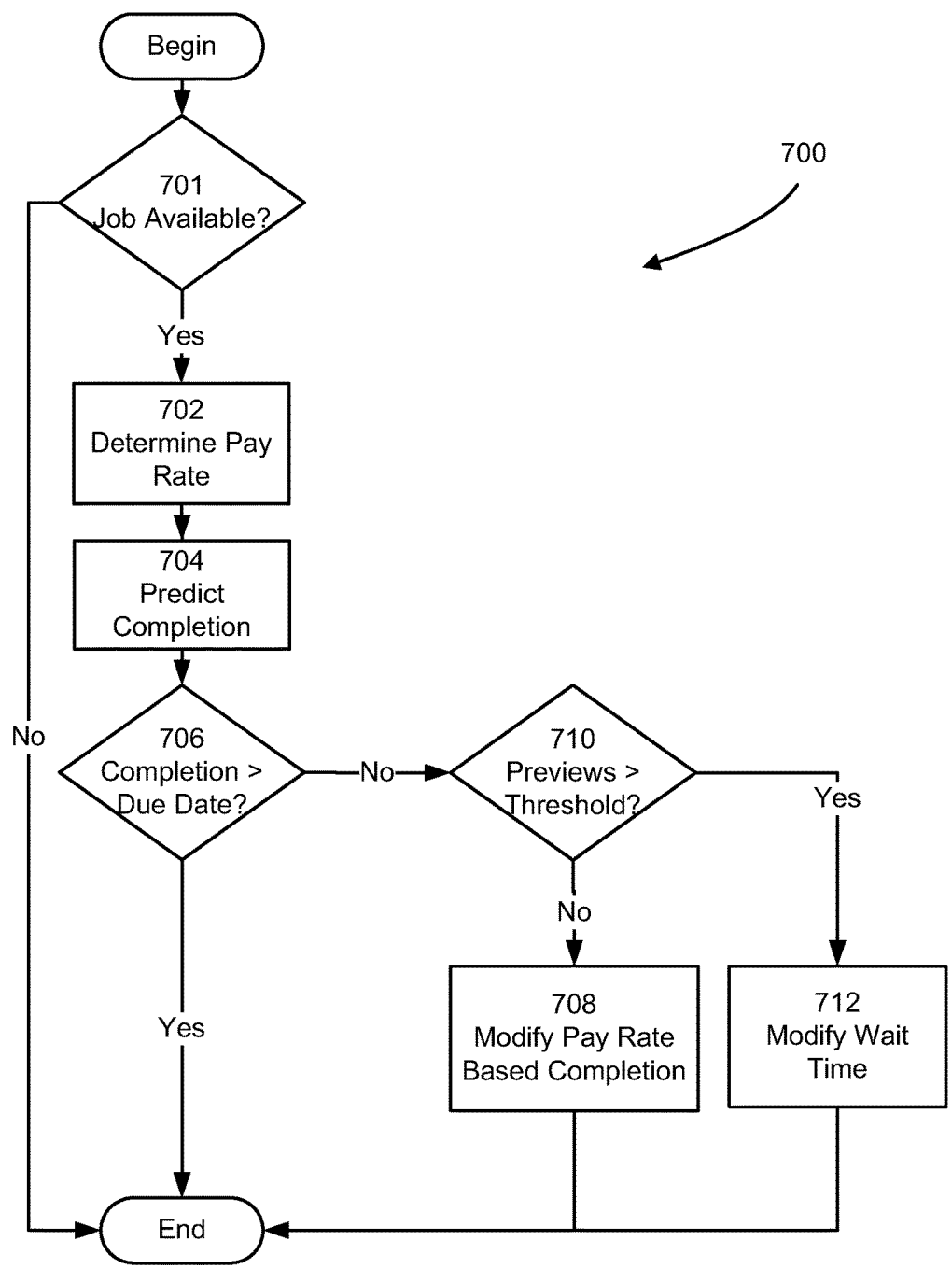
FIG. 7 is a flow diagram illustrating a process for determining transcription job attributes.

As discussed above with reference to FIGS. 4 and 6, some embodiments perform processes that set attributes of jobs using a transcription system, such as the transcription system 100 described above. One example of such a process is illustrated in FIG. 7. According to this example, a process 700 includes several acts that are described further below.

In act 701, the transcription system determines if the job is available. In not, the process 700 ends. Otherwise, the transcription system determines a pay rate for the job in act 702. The transcription system may make this determination based on any of a variety of factors including due date, difficulty, domain and ASR_cost.

In act 704, the transcription system predicts a completion date for the job for each editor. The transcription system may make this determination based on any of a variety of factors including difficulty, domain and historical XRT of previously completed, similar jobs.

In act 706, the transcription system determines whether the completion date is prior to the due date for the job. If so, the process 700 ends. Otherwise, the transcription system determines whether the number of previews provided for the job transgresses a threshold in act 710. If not, the transcription system executes act 708. Otherwise, the transcription system executes act 712.

In act 708, the transcription system modifies the pay rate based on the difference between the due date to the completion date, and the process 700 ends. For instance, the transcription system may set the modified pay rate equal to the unmodified pay rate plus a date increment amount multiplied by the difference between the due date and the completion date.

In act 712, the transcription system modifies the wait time for reassessment of the job, and the process 700 ends. For instance, the transcription system may set the modified wait time equal to the unmodified wait time plus an increment amount.

Processes 400 through 800 each depict one particular sequence of acts in a particular example. The acts included in these processes may be performed by, or using, one or more computer systems specially configured as discussed herein. Some acts are optional and, as such, may be omitted in accord with one or more examples. Additionally, the order of acts can be altered, or other acts can be added, without departing from the scope of the systems and methods discussed herein. Furthermore, as discussed above, in at least one example, the acts are performed on a particular, specially configured machine, namely a transcription system configured according to the examples and embodiments disclosed herein.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

What is claimed is:

1. A system for managing an electronic transcription market, the system comprising a server computer including:
  a memory;
  a network interface configured to exchange information with a first client computer and a second client computer;
  at least one processor coupled to the memory and the network interface;
  a customer interface component executable by the at least one processor and configured to receive, from the first client computer, media file information including at least one media file, the at least one media file including content;
  an automatic speech recognition (ASR) component executable by the at least one processor and configured to generate transcription information that represents a transcription of the content and to generate a predicted cost of editing the transcription information;
  a market engine component executable by the at least one processor and configured to:
    determine, based on the predicted cost, pay rate information that represents a pay rate for subsequent editing of the transcription;
    create a job record that represents a job;
    store the pay rate information in the job record; and
    store association information that associates the job record with the at least one media file; and
  an editor interface component executable by the at least one processor and configured to:
    display, via the second client computer, job information descriptive of a plurality of jobs available to be claimed by an editor, the plurality of jobs including the job;
    receive, via the second client computer, a request to preview the job;

display, via the second client computer, the pay rate information in response to receiving the request;

receive, from the second client computer, job claim information including an identifier of the job record; and store, in response to receiving the job claim information, assignment information that assigns the job record to the editor, wherein the market engine component is further configured to determine a predicted completion date for the job and to determine whether the predicted completion date is after a due date for the job.

2. The system according to claim 1, wherein the editor interface component is further configured to provide at least one preview of the job and the market engine component is configured to determine the pay rate information using a number of previews provided by the editor interface component.

3. The system according to claim 1, wherein the customer interface component is further configured to create at least one media file record that represents the at least one media file, the at least one media file record including information indicating the due date for transcription of the content and the market engine component is configured to determine the pay rate information using the due date.

4. The system according to claim 3, further comprising an administrator interface component executable by the at least one processor and configured to modify at least one attribute of the at least one media file that is used to determine the pay rate.

5. The system according to claim 3, wherein the market engine component is further configured to periodically determine an attribute of the job record.

6. The system according to claim 5, wherein the market engine component is configured to periodically determine the attribute upon expiration of a waiting period.

7. The system according to claim 6, wherein the editor interface component is further configured to provide at least one preview of the job and the market engine component is configured to modify the waiting period based on a number of previews provided by the editor interface component.

8. The system according to claim 7, wherein the attribute includes the pay rate information.

9. The system according to claim 8, wherein an attribute of the job record indicates that a claim has been accepted for the job, and the market engine component is further configured to
revoke the claim accepted for the job where the predicted completion date is after the due date.

10. The system according to claim 9, wherein an attribute of the job record indicates that progress has been made on the job, and the market engine component is further configured to
split the at least one media file into a plurality of media files where the predicted completion date is after the due date.

11. The system according to claim 1, wherein the market engine component is further configured to modify an attribute of the job record that indicates whether an editor may claim the job.

12. A non-transitory computer readable medium storing instructions that when executed by at least one processor of a server computer including a network interface cause the server computer to:
execute a customer interface component, an automatic speech recognition (ASR) component, a market engine component, and an editor interface component;

receive, from a first client computer via the network interface and the customer interface component, media file information including at least one media file, the at least one media file including content;

generate, via the ASR component, transcription information and a predicted cost of editing the transcription information, the transcription information representing a transcription of the content;

determine, based on the predicted cost via the market engine component, pay rate information that represents a pay rate for subsequent editing of the transcription;

create, via the market engine component, a job record that represents a job;

store, via the market engine component, the pay rate information in the job record;

store, via the market engine component, association information that associates the job record with the at least one media file:

display, on a second client computer via the network interface and the editor interface component, job information descriptive of a plurality of jobs available to be claimed by an editor, the plurality of jobs including the job;

receive, via the second client computer, a request to preview the job;

display, on the second client computer via the network interface and the editor interface component, the pay rate information in response to receiving the request;

receive, from the second client computer via the network interface and the editor interface component, job claim information including an identifier of the job record;

store, via the editor interface component in response to receiving the job claim information, assignment information that assigns the job record to an editor;

determine, via the market engine component, a predicted completion date for the job; and determine, via the market engine component, whether the predicted completion date is after a due date for the job.

13. The non-transitory computer readable medium of claim 12, wherein the instructions include instructions that when executed by the at least one processor of the server computer cause the server computer to:
provide, via the editor interface component, at least one preview of the job; and
determine, via the market engine component, the pay rate information using a number of previews provided via the editor interface component.

14. The non-transitory computer readable medium of claim 12, wherein the instructions include instructions that when executed by the at least one processor of the server computer cause the server computer to:
create, via the customer interface component, at least one media file record that represents the at least one media file, the at least one media file record including information indicating the due date for transcription of the content; and
determine, via the market engine component, the pay rate information using the due date.

15. The non-transitory computer readable medium of claim 14, wherein the instructions include instructions that when executed by the at least one processor of the server computer cause the server computer to:
execute an administrator interface component; and
modify, via the administrator interface component, at least one attribute of the at least one media file that is used to determine the pay rate.

16. The non-transitory computer readable medium of claim 14, wherein the instructions include instructions that when executed by the at least one processor of the server computer cause the server computer to periodically determine, via the market engine component, an attribute of the job record.

17. The non-transitory computer readable medium of claim 16, wherein the instructions include instructions that when executed by the at least one processor of the server computer cause the server computer to periodically determine, via the market engine component, the attribute upon expiration of a waiting period.

18. The non-transitory computer readable medium of claim 17, wherein the instructions include instructions that when executed by the at least one processor of the server computer cause the server computer to:
provide, via the editor interface component, at least one preview of the job; and
modify, via the market engine component, the waiting period based on a number of previews provided via the editor interface component.

19. The non-transitory computer readable medium of claim 18, wherein the attribute includes the pay rate information.

20. The non-transitory computer readable medium of claim 19, wherein an attribute of the job record indicates that a claim has been accepted for the job and the instructions include instructions that when executed by the at least one processor of the server computer cause the server computer to
revoke, via the market engine component, the claim accepted for the job where the predicted completion date is after the due date.

21. The non-transitory computer readable medium of claim 20, wherein an attribute of the job record indicates that progress has been made on the job and the instructions include instructions that when executed by the at least one processor of the server computer cause the server computer to
split, via the market engine component, the at least one media file into a plurality of media tiles where the predicted completion date is after the due date.

22. The non-transitory computer readable medium of claim 12, wherein the instructions include instructions that when executed by the at least one processor of the server computer cause the server computer to modify, via the market engine component, an attribute of the job record that indicates whether an editor may claim the job.

23. A method of managing an electronic transcription market using a server computer including a network interface configured to exchange information with a first client computer and a second client computer, the method comprising:
executing a customer interface component, an automatic speech recognition (ASR) component, a market engine component, and an editor interface component;
receiving, from the first client computer via the customer interface component, media file information including at least one media file, the at least one media file including content;
generating, via the ASR component, transcription information and a predicted cost of editing the transcription information, the transcription information representing a transcription of the content;
determining, based on the predicted cost via the market engine component, pay rate information that represents a pay rate for subsequent editing of the transcription;
creating, via the market engine component, a job record that represents a job;
storing, via the market engine component, the pay rate information in the job record;
storing, via the market engine component, association information that associates the job record with the at least one media file;
displaying, on a second client computer via the network interface and the editor interface component, job information descriptive of a plurality of jobs available to be claimed by an editor, the plurality of jobs including the job;
receive, via the second client computer, a request to preview the job;
displaying, on the second client computer via the network interface and the editor interface component, the pay rate information in response to receiving the request;
receiving, from the second client computer via the editor interface component, job claim information including an identifier of the job record;
storing, via the editor interface component in response to receiving the job claim information, assignment information that assigns the job record to an editor;
determining, via the market engine component, a predicted completion date for the job; and
determining, via the market engine component, whether predicted completion date is after due date for the job.

24. The method according to claim 23, further comprising providing at least one preview of the job, wherein determining the pay rate information includes determining the pay rate information using a number of previews provided.

25. The method according to claim 23, further comprising creating at least one media file record that represents the at least on media file, the at least one media file record including information indicating the due date for transcription of the content, wherein determining the pay rate information includes determine the pay rate information using the due date.

26. The method according to claim 25, wherein determining the pay rate information includes determining the pay rate information using an attribute of the at least one media file record other than the due date.

27. The method according to claim 25, further comprising periodically determining an attribute of the job.

28. The method according to claim 27, wherein periodically determining the attribute of the job includes periodically determining the attribute upon expiration of a waiting period.

29. The method according to claim 28, further comprising:
providing at least one preview of the job; and
modifying the waiting period based on a number of previews provided.

30. The method according to claim 29, wherein periodically determining the attribute of the job includes periodically determining the pay rate information.

31. The method according to claim 30, wherein an attribute of the job record indicates that a claim has been accepted for the job, and the method further comprises:
revoking the claim accepted for the job where the predicted completion date is after the due date.

32. The method according to claim 31, wherein an attribute of the job record indicates that progress has been made on the job, and the method further comprises
splitting the at least one media file into a plurality of media files where the predicted completion date is after the due date.

33. The method according to claim 23, further comprising modifying an attribute of the job record that indicates whether an editor may claim the job.

\* \* \* \* \*